US012751466B2

(12) United States Patent
Shinada et al.

(10) Patent No.: US 12,751,466 B2
(45) Date of Patent: Oct. 6, 2026

(54) METHOD FOR PRODUCING PLANT-BASED MILK FERMENTATION PRODUCT

(71) Applicant: GODO SHUSEI CO., LTD., Matsudo (JP)

(72) Inventors: Atsuko Shinada, Matsudo (JP); Masahiro Baba, Matsudo (JP); Takeshi Hirama, Matsudo (JP)

(73) Assignee: GODO SHUSEI CO., LTD., Matsudo (JP)

( * ) Notice: Subject to any disclaimer, the term of this patent is extended or adjusted under 35 U.S.C. 154(b) by 520 days.

(21) Appl. No.: 18/001,734

(22) PCT Filed: Jun. 16, 2021

(86) PCT No.: PCT/JP2021/022866

§ 371 (c)(1),
(2) Date: Mar. 2, 2023

(87) PCT Pub. No.: WO2021/256507

PCT Pub. Date: Dec. 23, 2021

(65) Prior Publication Data

US 2023/0292778 A1 Sep. 21, 2023

(30) Foreign Application Priority Data

Jun. 16, 2020 (JP) ................................ 2020-103889

(51) Int. Cl.
*A23C 11/10* (2025.01)
*A23L 5/20* (2016.01)
(Continued)

(52) U.S. Cl.
CPC ............ *A23C 11/106* (2013.01); *A23C 11/10* (2013.01); *A23L 5/25* (2016.08); *A23L 11/33* (2016.08); *A23L 11/50* (2021.01); *A23L 11/65* (2021.01)

(58) Field of Classification Search
CPC ............ A23L 5/25; A23L 11/50; A23L 11/33
See application file for complete search history.

(56) References Cited

U.S. PATENT DOCUMENTS

2018/0368429 A1* 12/2018 Sato ........................ C12P 1/00

FOREIGN PATENT DOCUMENTS

CN 103053950 A 4/2013
CN 108366571 A 8/2018
(Continued)

OTHER PUBLICATIONS

Extended European Search Report issued Jul. 30, 2024 in European Patent Application No. 21825223.7, 7 pages.
(Continued)

*Primary Examiner* — Michele L Jacobson
(74) *Attorney, Agent, or Firm* — Oblon, McClelland, Maier & Neustadt, L.L.P.

(57) ABSTRACT

An object of the present invention is to provide a method for producing a vegetable milk fermented product obtained by applying a protease or cellulase to vegetable milk, the vegetable milk fermented product has less bitterness without undergoing an enzyme inactivation step. A method for producing a vegetable milk fermented product, comprising: a first step of mixing vegetable milk and lactic acid bacteria to obtain a mixed liquid; and then a second step of fermenting the mixed liquid; wherein before the second step is completed, a step of adding a protease from *Paenibacillus* sp. or *Trichoderma* sp. to the vegetable milk or the mixed liquid (protease addition step) or a step of adding a cellulase from *Trichoderma* sp. (cellulase addition step) to the vegetable milk or the mixed liquid is performed.

7 Claims, 12 Drawing Sheets

(51) Int. Cl.
*A23L 11/30* (2016.01)
*A23L 11/50* (2021.01)
*A23L 11/65* (2025.01)

(56) References Cited

FOREIGN PATENT DOCUMENTS

| | | | | |
|---|---|---|---|---|
| JP | 55-88652 | A | | 7/1980 |
| JP | 5-268907 | A | | 10/1993 |
| JP | 7-147898 | A | | 6/1995 |
| JP | 2002-320473 | A | | 11/2002 |
| JP | 2003-335695 | A | | 11/2003 |
| JP | 2008-283948 | A | | 11/2008 |
| JP | 2009-82010 | A | | 4/2009 |
| JP | 2011-135832 | A | | 7/2011 |
| JP | 2013-215107 | A | | 10/2013 |
| JP | 2015050993 | A | * | 3/2015 |
| JP | 2016-67240 | A | | 5/2016 |
| JP | 2019-176780 | A | | 10/2019 |
| WO | WO 2005/032568 | A1 | | 4/2005 |
| WO | WO 2017/104729 | A1 | | 6/2017 |
| WO | WO 2018/079758 | A1 | | 5/2018 |

OTHER PUBLICATIONS

Combined Chinese Office Action and Search Report issued Aug. 20, 2024 in Chinese Patent Application No. 202180042717.0 (with unedited, machine-generated English translation), 15 pages.

Anonymous., "Cellulase RS," Retrieved from the Internet [URL: https://web.archive.org/web/20140927021418/ https://www.duchefa-biochemie.com/product/details/number/C8003], Retrieved on Jul. 12, 2024, XP093185146., 1 page.

Hsia Sheng-Yang H et al., "Aggregation of soy protein-isoflavone complexes and gel formation induced by glucono-[delta]-lactone in soymilk," Scientific Reports, Oct. 20, 2016, Retrieved from the Internet [URL: https://www.nature.com/articles/srep35718], XP093185263., 2 pages.

<URL:https://web.archive.org/web/20200607120848/http://www.j-enzyme.com/enzymelist/enzyme_I.html>, Japan Enzyme Association, non-official translation (Enzymes related to sugar, 1.3 Enzymes related to β-glucan (cellulase, etc.), Jun. 1, 2020, [retrieved on Jul. 29, 2021], 8 pages.

<URL:https://web.archive.org/web/20190907081337/http://www.j-enzyme.com/enzyme1ist/enzyme_2.htm1>, paragraph [0005], (Japan Enzyme Association), non-official translation (Protein / amino acid related), Sep. 7, 2019, 4 pages.

International Search Report with English Translation mailed on Aug. 17, 2021 in PCT/JP2021/022866 filed on Jun. 16, 2021, (7 pages).

International Preliminary Report on Patentability and Written Opinion issued Dec. 29, 2022 in PCT/JP2021/022866 (submitting English translation only), 7 pages.

Luis Alberto Campos, et al., The active site of pepsin is formed in the intermediate conformation dominant at mildly acidic pH, FEBS Letters 538 (2023) 89-95 (7 pages).

* cited by examiner

* WATER SEPARATION RATE WHEN THE AMOUNT OF WATER SEPARATION IN COMPARATIVE EXAMPLE IS SET TO 100%.

* WATER SEPARATION RATE WHEN THE AMOUNT OF WATER SEPARATION IN COMPARATIVE EXAMPLE 11 IS SET TO 100%.

METHOD FOR PRODUCING PLANT-BASED MILK FERMENTATION PRODUCT

CROSS-REFERENCE TO RELATED APPLICATIONS

The present application is a 35 U.S.C. § 371 national stage patent application of International patent application PCT/JP2021/022866 filed on Jun. 16, 2021, which is based on and claims the benefits of priority to Japanese Application No. 2020-103889, filed on Jun. 16, 2020. The entire contents of these applications are incorporated herein by reference.

TECHNICAL FIELD

The present invention relates to a method for producing a vegetable milk fermented product.

BACKGROUND ART

Vegetable milk is obtained from plants. Examples of vegetable milk obtained from soybean include soy milk. Soy milk fermented products obtained by adding lactic acid bacteria to soy milk and fermenting the mixture are known (see, for example, Patent Literature 1).

Patent Literature 1 describes a soybean beverage that was produced by applying a proteolytic enzyme to soybean milk, followed by inoculation and fermentation with a lactic acid bacteria starter. The example describes that enzyme-treated soy milk is obtained by reacting papain with soy milk obtained from soybeans, then lactic acid bacteria starter (a mixed liquid of *Lactobacillus bulgaricus* and *Lactobacillus acidophilus* cultures in a specified ratio) is added and fermented at 35 to 40° C. for 6 to 12 hours. The obtained beverages were evaluated for bitterness.

When a proteolytic enzyme (protease) is applied to soy milk, it causes bitterness even when fermented with a lactic acid bacteria starter.

An example of a method to solve this problem is the method described in Patent Literature 2.

Patent Literature 2 describes a method for producing a soy milk fermented product, including an enzyme treatment step of hydrolyzing soy milk with a peptide bond hydrolase, an enzyme inactivation step of inactivating the peptide bond hydrolase to obtain a fermented substrate, and a fermentation step of fermenting the fermented substrate with a lactic acid bacterium belonging to *Lactobacillus brevis.*

It is described that the enzyme inactivation step can suppress hydrolysis by peptide bond hydrolases in the fermentation step, thus reducing the bitterness of soy milk fermented products (paragraph 0031).

CITATION LIST

Patent Literature

Patent Literature 1: JP 55-088652 A
Patent Literature 2: JP 2013-215107 A

SUMMARY OF INVENTION

Technical Problem

In Patent Literature 2, after a peptide bond hydrolase (protease) is applied to soy milk, an enzyme inactivation step is inserted before the fermentation step of soy milk with the lactic acid bacterium to prevent bitterness from occurring in the soy milk fermented product.

However, because the enzyme inactivation step requires 30 to 120 minutes at 60° C. to 100° C. (paragraph 0032), there has been a need for a method to obtain soy milk fermented products with less bitterness without this step.

Foods with a bitterness tend to be disliked by consumers. There is a potential demand not only for soy milk fermented products with less bitterness, but also for vegetable milk fermented products with less bitterness.

Therefore, an object of the present invention is to provide a method for producing a vegetable milk fermented product obtained by applying a protease or other enzyme to vegetable milk such as soy milk, the vegetable milk fermented product has less bitterness without undergoing an enzyme inactivation step.

Solution to Problem

The present inventors found that by adding a specific protease or cellulase to vegetable milk and fermenting it with lactic acid bacteria, a vegetable milk fermented product with less bitterness can be obtained without an enzyme inactivation step, and have completed the present invention.

(A) A method for producing a vegetable milk fermented product, including:
  a first step of mixing vegetable milk and lactic acid bacteria to obtain a mixed liquid; and then
  a second step of fermenting the mixed liquid,
  in which before the second step is completed, a step of adding a protease from *Paenibacillus* sp. or *Trichoderma* sp. to the vegetable milk or the mixed liquid (protease addition step) or a step of adding a cellulase from *Trichoderma* sp. (cellulase addition step) to the vegetable milk or the mixed liquid is performed.

(B) The method for producing a vegetable milk fermented product according to (A), in which the protease addition step or the cellulase addition step is performed at substantially the same time as the first step.

(C) The method for producing a vegetable milk fermented product according to (A) or (B), in which the addition amount of the protease from *Paenibacillus* sp. or *Trichoderma* sp. is from 0.001 to 20.0 PU/g based on the total mass of the vegetable milk.

(D) The method for producing a vegetable milk fermented product according to any one of (A) to (C), in which the addition amount of cellulase is from 0.001 to 1 U/g in terms of FPase activity and from 0.0001 to 22 U/g in terms of CMCase activity based on the total mass of the vegetable milk.

(E) The method for producing a vegetable milk fermented product according to any one of (A) to (D), in which the protein contained in the vegetable milk is from 0.1% to 20% by mass.

(F) The method for producing a vegetable milk fermented product according to any one of (A) to (E), in which the protease addition step or the cellulase addition step is performed.

(G) The method for producing a vegetable milk fermented product according to any one of (A) to (E), in which the protease has the following properties (1) to (4):
  (1) it is produced by a bacterium belonging to *Paenibacillus* sp.;
  (2) it is stable at pH 5.5 to 9.0 and its optimum pH is from 7.0 to 8.0;

(3) it acts at 20 to 75° C. and its optimum temperature is from 50 to 60° C.; and (4) its molecular weight is estimated to be from 32,000 to 34,000 Da by SDS polyacrylamide gel electrophoresis.

(H) The method for producing a vegetable milk fermented product according to any one of (A) to (G), in which the vegetable milk includes at least one selected from soy milk, almond milk, oat milk, and macadamia nut milk, or an extract or concentrate thereof.

Advantageous Effects of Invention

The present invention provides a method for producing a vegetable milk fermented product such as soy milk fermented product obtained by applying a specific protease or a specific cellulase to vegetable milk such as soy milk, the vegetable milk fermented product has less bitterness without undergoing an enzyme inactivation step. The production method is found to accelerate fermentation of lactic acid bacteria and shorten the fermentation time.

The soy milk fermented product obtained by the above production method has a smooth texture, low water separation, and a reduced soybean smell.

DESCRIPTION OF EMBODIMENTS

Figure 1:
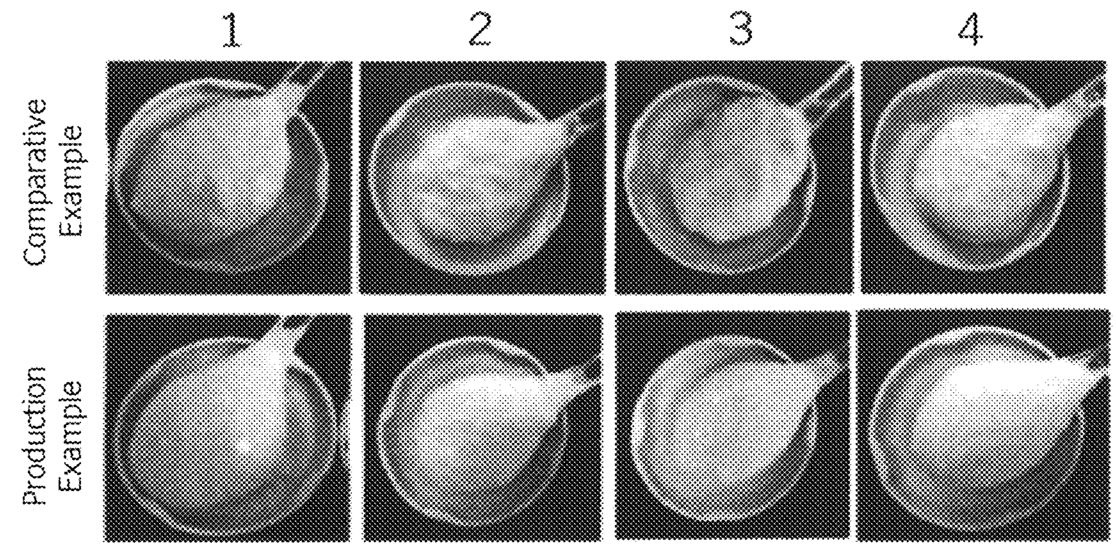
FIG. 1 shows photographs of the appearance of the soy milk fermented products of Production Examples 1 to 4 and Comparative Examples 1 to 4 when they were scooped out with a spoon after stirring.

The method for producing a vegetable milk fermented product such as a soy milk fermented product according to the present invention includes:

a first step of mixing vegetable milk such as soy milk with lactic acid bacteria to obtain a mixed liquid; and then a second step of fermenting the mixed liquid, in which before the second step is completed, a step of adding a protease from *Paenibacillus* sp. or *Trichoderma* sp. to the vegetable milk or the mixed liquid (protease addition step) or a step of adding a cellulase from *Trichoderma* sp. (cellulase addition step) to the vegetable milk or the mixed liquid is performed. After applying a protease from *Paenibacillus* sp. or a cellulase from *Trichoderma* sp. to the vegetable milk, it is not necessary to provide a separate step to inactivate the protease or cellulase. No bitterness is caused in the vegetable milk such as soy milk fermented product to which a protease from *Paenibacillus* sp. (hereinafter may be referred to as P protease) or a cellulase from *Trichoderma* sp. (hereinafter may be referred to as T cellulase) is applied, and no bitterness is caused in the vegetable milk fermented product such as soy milk fermented product when the milk is fermented by lactic acid bacteria. As the addition amount of P protease or T cellulase increases, the vegetable milk may produce bitterness, but the bitterness is reduced by lactic acid bacteria fermentation of the vegetable milk. When bitterness is caused in the vegetable milk fermented product, the addition amount of P protease or T cellulase may be reduced, and the reaction time of P protease or T cellulase may be reduced.

A separate step here refers to a new dedicated process for inactivating P protease and T cellulase, and does not include cases where P protease and T cellulase are inactivated in the first or second step. P protease and T cellulase may be inactivated in the first or second step. P protease is likely to act in a neutral range and is inactivated in acidic conditions. Protease and T cellulase from *Trichoderma* sp. have an optimum pH in the slightly acidic range and are not easily inactivated after fermentation.

For example, as the fermentation of soy milk by lactic acid bacteria proceeds, P protease activity decreases as the pH decreases, while the activity of protease and T cellulase from *Trichoderma* sp. is maintained. As the second step progresses, P protease activity decreases, and depending on the pH of the soy milk fermented product, P protease may be inactivated or may be present in a non-functional state. Not only in soy milk, but also in other vegetable milk, the pH tends to decrease as the fermentation of the vegetable milk proceeds.

The protease addition step and cellulase addition step are preferably performed one or more times selected from before or at substantially the same time as the first step. It may be performed two or more times. After the protease addition step, the protein in the soy milk is degraded. The protease addition step and cellulase addition step may be performed simultaneously or separately.

In the present invention, it is preferable to perform the protease addition step and cellulase addition step at substantially the same time as the first step. "Substantially the same time" means relative, which varies depending on the growth rate of the lactic acid bacteria used, and means that the lactic acid bacteria used are in the lag phase. When there is a plurality of lactic acid bacteria to be used, at least one of them should be in the lag phase. Performing the protease addition step and cellulase addition step at the time when the lactic acid bacteria used are in the lag phase improves the fermentation rate of vegetable milk such as soy milk by lactic acid bacteria.

Hereinafter, materials that can be used in the present invention will be mainly described.

<<<Raw Materials of Vegetable Milk Fermented Product>>

<<P Protease>

P protease has the following properties:

(1) it is produced by bacteria belonging to *Paenibacillus* sp.;

(2) its optimal pH is 7.0 to 8.0;

(3) it is a neutral protease that is stable at pH 5.5 to 9.0;

(4) it acts at 20 to 75° C., and the optimum temperature is 55° C.; and (5) its molecular weight is estimated to be 32,000 to 34,000 Da by electrophoresis.

*Paenibacillus* sp. was formerly classified in *Bacillus* sp., but was recently reclassified and proposed as a new genus. Proteases having the above properties can be obtained from different species, including *Paenibacillus polymyxa* or *Paenibacillus* sp. re-identified from *Bacillus polymyxa*. In some literature it may be labeled *Bacillus polymyxa*, but it is synonymous.

In detail, P protease has the following properties.

(a) Action

P protease exhibits general properties as a neutral protease, degrading proteins such as casein and hemoglobin to produce peptides or free amino acids in the neutral pH range.

P protease has been confirmed to cleave 12 peptide bonds in the B chain of oxidized insulin: Pha(1)-Val(2), His(5)-Leu(6), His(10)-Leu(11), Glu(13)-Ala(14), Ala(14)-Ler(15), Ler(15)-Tyr(16), Tyr(16)-Leu(17), Leu(17)-Val(18), Gly (23)-Phe(24), Phe(24)-Phe(25), Phe(25)-Tyr(26), and Lys (29)-Ala(30).

(b) Stable pH Range

Stable pH range: P protease is extremely stable in the range of 5.5 to 9.0.

(c) Range of Optimum Action Temperature

P protease acts in the range of 20° C. to 75° C., with an optimum temperature of 50° C. to 60° C. The optimum temperature is 55° C.

(d) Conditions for Inactivation by pH, Temperature, Etc.

P protease is completely inactivated at pH 3.0 or lower and pH 10.0 or higher. In addition, it is completely inactivated by heat treatment at 65° C. for 10 minutes.

(e) Inhibition, Activation, and Stabilization

P protease is inhibited by metal chelators such as ethylenediaminetetraacetate (EDTA), citric acid, 0-phenanthroline, 2,2-dipyridyl, and sodium fluoride, and oxidants such as N-bromosuccinimide (NBS) and iodine.

P protease is stabilized by calcium ions and requires zinc ions for activity.

(f) Molecular Weight

The molecular weight by electrophoresis is estimated to be 32,000 to 34,000 Da.

Proteases are classified into the following five types according to their catalytic sites. Acid proteases (catalytic site; aspartic acid, for example, pepsin), metalloproteases (catalytic site; metal), serine proteases (catalytic site; serine, for example, trypsin), cysteine proteases (catalytic site; amino acids with SH groups such as cysteine, for example, papain), and a mixture of at least two of these (for example, actinase AS). The P protease used in the present invention is classified as a neutral metalloprotease. As described later, neutral proteases are inactivated when the pH of soy milk decreases due to fermentation, so P protease is present in an inactivated or non-functional state in the soy milk fermented product of the present invention.

P protease is an endo-type neutral metalloprotease. Endo-type proteases roughly degrade proteins and reduce their molecular weight. When a protease is applied to vegetable milk such as soy milk, in many cases, bitterness is caused. However, little bitterness is caused when P protease is applied to vegetable milk such as soy milk. The increase in sourness has the effect of increasing freshness and reducing the soy milk smell.

(Type of Raw Material Organisms)

Proteases have been isolated from a very wide range of organisms, including microorganisms. Preferred proteases are microbial proteases in terms of price and reactivity. Examples of such proteases include proteases derived from microorganisms belonging to *Bacillus, Paenibacillus, Geobacillus, Aspergillus, Rhizopus, Rhizomucor*, and *Streptomyces* sp., and proteases derived from lactic acid bacteria. The P protease that can be used as an enzyme in the present invention is a protease derived from *Paenibacillus* sp., specifically, a protease derived from a microorganism (bacterium) selected from the group consisting of *Paenibacillus polymyxa, Paenibacillus macerans, Paenibacillus pabuli, Paenibacillus peoriae, Paenibacillus thiaminolyticus, Paenibacillus validus, Paenibacillus glucanolyticus, Paenibacillus kobensis, Paenibacillus lautus, Paenibacillus alginolyticus, Paenibacillus alvei, Paenibacillus amylolyticus, Paenibacillus chitinolyticus, Paenibacillus chondroitinus, Paenibacillus curdlanolyticus, Paenibacillus durus, Paenibacillus ehimensis*, and *Paenibacillus* sp.

P protease may be in any form, such as purified enzyme, semi-purified enzyme, crude enzyme, or crushed bacteria (preferably lyophilized). It is sufficient that the P protease has a degrading action on the protein contained in the vegetable milk. However, because many proteases that degrade proteins in vegetable milk tend to cause bitterness or strange tastes, the P protease is preferably a metalloprotease with the aforementioned properties derived from *Paenibacillus* sp., especially *Paenibacillus polymyxa*, or a microorganism (bacterium) belonging to *Paenibacillus* sp., whose 16s rDNA homology is 98% or more compared to the sequence of *Paenibacillus polymyxa*. Metalloproteases from these genera, even when added to vegetable milk, degrade the proteins in the vegetable milk and do not cause bitterness in the vegetable milk fermented product. The increase in sourness has the effect of increasing freshness and reducing the smell derived from vegetable milk such as soy milk smell.

The metalloprotease suitable for the present invention has a residual activity of 10% or less when reacted with azocasein as a substrate at pH 4.5 for 1 hour at 43° C., which is a common fermentation temperature for vegetable milk fermented products. This property ensures that the protease activity does not remain in the vegetable milk fermented product and that the protease does not adversely affect the vegetable milk fermented product during storage.

(P Protease Production Method)

The P protease used in the present invention may be collected from a microorganism and purified by a conventional common method. Therefore, the protease can be produced by genetic or non-genetic recombination. For example, it can be obtained as the culture supernatant of *Paenibacillus polymyxa* NBRC 15309 strain cultured in Nutrient medium (manufactured by Difco) and others, and filtered or centrifuged from the culture. Alternatively, it may be produced by identifying the active components (proteins and gene) of *Paenibacillus polymyxa* and recombining the gene into other microorganism. In addition, the culture supernatant solution obtained may be purified by column chromatography or ammonium sulfate fractionation as appropriate. The enzyme solution obtained may be in liquid form or may be powdered by spray drying or lyophilization. In such cases, commonly used stabilizers and excipients may be added.

(Addition Amount of P Protease)

The addition amount of P protease is preferably from 0.001 to 20.0 PU/g, more preferably from 0.005 to 10.0 PU/g, even more preferably from 0.01 to 10.0 PU/g, and particularly preferably from 0.01 to 5.0 based on the total mass of the vegetable milk. The addition amount is more preferably from 0.25 to 5.0 PU/g. The reason is that within this range, the unevenness in hardness of the fermented vegetable milk fermented product is reduced and the texture becomes smoother. As the addition amount of P protease increases, the lower (softer) the hardness of the vegetable milk fermented product tends to be compared to the vegetable milk fermented product without P protease. This trend applies especially to soy milk fermented products and almond milk fermented products among vegetable milk fermented products.

The addition amount of the P protease (enzyme amount) can be calculated as enzyme activity per enzyme weight based on an enzyme amount of 1.0 PU defined by the following method. 1 mL of the enzyme diluent is added to a 0.6% casein solution (pH 7.5, 50 mM Tris hydrochloric acid buffer containing 2 mM calcium acetate), the mixture is allowed to react at 30° C. for 10 minutes, to which 5 mL of a trichloroacetic acid reagent (pH 4.0, 1.8% sodium acetate anhydrous, 1.8% trichloroacetic acid, and 1.98% acetic acid) is added to stop the reaction, allowed to stand at 30° C. for another 30 minutes, filtered, and the absorbance is measured at 275 nm. The amount of enzyme (enzyme activity) that releases an amino acid equivalent to 1 μg of tyrosine per minute under these conditions is defined as 1 PU (Protease Unit).

<T Cellulase>

T cellulase has the following properties:

(1) it is produced by molds belonging to *Trichoderma* sp.;

(2) its optimum pH is from 4.0 to 5.5;

(3) it is stable at pH 4.0 to 6.0 and optimum pH is 5.0; and (4) it acts in the range of 30° C. to 75° C., with an optimum temperature of 55° C. to 60° C.

(T Cellulase Production Method)

The T cellulase used in the present invention may be collected from a microorganism and purified by a conventional common method. Therefore, the cellulase can be produced by genetic or non-genetic recombination. For example, a commercially available *Trichoderma reesei* strain can be cultured in a medium containing cellulose as a carbon source, and the culture supernatant can be obtained by filtration or centrifugation from the culture. Alternatively, it may be produced by identifying the active components (proteins and gene) of *Trichoderma reesei* and recombining the gene into other microorganism. In addition, the culture supernatant solution obtained may be purified by column chromatography or ammonium sulfate fractionation as appropriate. The enzyme solution obtained may be in liquid form or may be powdered by spray drying or lyophilization. In such cases, commonly used stabilizers and excipients may be added.

The T cellulase preferably contain protease as a minor enzyme.

(Addition Amount of T Cellulase)

The addition amount of T cellulase is preferably from 0.0001 to 1 U/g (final concentration) in terms of FPase activity, more preferably from 0.0005 to 0.5 U/g, even more preferably from 0.001 to 0.1 U/g based on the total mass of the vegetable milk. The addition amount of the cellulase is preferably from 0.001 to 22 U/g (final concentration) in terms of CMCase activity, more preferably from 0.005 to 15 U/g, even more preferably from 0.01 to 10 U/g based on the total mass of the vegetable milk.

T cellulase preferably have at least one of the FPase or CMCase activities, and preferably both of them.

The addition amount of T cellulase (enzyme amount) can be calculated as enzyme activity per enzyme weight based on the enzyme amount defined by the following method.

One FP unit refers to the amount of enzyme that produces reducing sugar equivalent to 1 μmol of glucose per minute when the enzyme solution diluted with a buffer is applied to 50 mg of a piece of cellulose paper and the amount of reducing sugar produced in 0.05 M citrate buffer (pH 4.8) at 50° C. for 60 minutes is measured by the dinitrosalicylic acid method. If the amount of cellulase used is less than or equal to the lower limit of the above range, the decomposition of insoluble matter in soy milk is not sufficient and the fermentation acceleration effect is not achieved. On the other hand, if the amount used is above the upper limit, it is uneconomic.

One CMC unit refers to the amount of enzyme that produces reducing sugar equivalent to 1 μmol of glucose per minute when the enzyme solution is applied to 5 mg of sodium carboxymethylcellulose (CMC) and the amount of reducing sugar produced in 0.05 M citrate buffer (pH 4.8) at 50° C. for 30 minutes is measured by the dinitrosalicylic acid method.

In addition to the FPase and CMCase activities described above, protease activity may be used as an index of the addition amount of T cellulase. The protease activity contained in T cellulase can be measured by the same method as the activity value of P protease.

When the protease activity in T cellulase is used as an index, the addition amount is preferably from 0.001 to 20.0 PU/g, more preferably from 0.005 to 10.0 PU/g, even more preferably from 0.01 to 10.0 PU/g, and particularly preferably from 0.01 to 5.0 based on the total mass of the vegetable milk. The addition amount is more preferably from 0.25 to 5.0 PU/g. The protease activity in T cellulase may be determined by the same method for measuring the activity of P protease.

The FPase, CMCase, and protease activities in T cellulase may be a combination of all of the above ranges, and if necessary, each activity may be used in combination with the above ranges.

CMCase in T cellulase has a pH stability range of from 3.5 to 6.0, while FPase has a pH stability range of from 4.5 to 7.5.

<Lactic Acid Bacteria Starter>

The vegetable milk fermented product of the present invention uses a lactic acid bacteria starter in its production method. The lactic acid bacteria used in the present invention are not particularly limited, but conventionally used lactic acid bacteria such as *Lactobacillus delbrueckii* subsp. *bulgaricus, Streptococcus thermophilus, Lactobacillus casei*, and *Lactobacillus paracasei* may be used. These lactic acid bacteria starters can be obtained by purchasing commercial products that are generally available on the market, or by using strains that have been independently isolated. A combination of a plurality of lactic acid bacteria of the same species or a combination of a plurality of lactic acid bacteria of different species may be used. Probiotic bacteria such as bifidobacteria may be added at the same time as the starter. Since bifidobacteria are difficult to grow, the growth of bifidobacteria in a vegetable milk fermented product (especially when other bacteria (including another lactic acid bacteria) coexist) is an advantageous effect.

<Addition Amount of Lactic Acid Bacteria Starter>

The addition amount of the lactic acid bacteria starter is not particularly limited. The addition amount may be a general amount. For example, when a lyophilized starter manufactured by Chr. Hansen Holding A/S is used, the amount is from 0.1 to 0.5 mg/g based on vegetable milk, but the addition amount is not limited as long as the addition amount is sufficient to allow the growth of lactic acid bacteria.

<Vegetable Milk>

Vegetable milk is obtained from plants. Legumes, nuts, and grains may be used as raw materials of vegetable milk. Examples of raw materials of legume milk include soy milk and peanuts. Examples of nut raw materials include almonds, walnuts, pistachios, hazelnuts, cashews, pecan nuts, and macadamia nuts. Examples of raw materials of grain milk include rice and oats. These vegetable milks can be produced by conventional methods. Commercial products of vegetable milk may be used. These raw materials of vegetable milk may be used alone or in combination. Vegetable milks may be produced and then mixed together.

The amount of protein in the vegetable milk is preferably from 0.1% to 20% by mass, more preferably from 0.3% to 15% by mass, and even more preferably from 1.0% to 10% by mass. As the amount of protein in the vegetable milk increases, the vegetable milk tends to coagulate more easily and the vegetable milk fermented product tends to gel and the gel strength of the fermented product tends to increase. As the amount of protein in the vegetable milk decreases, the vegetable milk is less likely to coagulate and the vegetable milk fermented product is more likely to become liquid.

It is also possible to obtain a liquid milk fermented product by crushing and homogenizing the gelled vegetable milk fermented product. The shape of the vegetable milk fermented product may be determined according to the desired characteristics.

The amount of protein in the vegetable milk can be measured by the Bradford or Lowry method.

The total mass of the vegetable milk in the present invention includes all mass other than the amount of enzyme to be added. That is, in addition to the mass of the vegetable milk, the mass of the additives described below is also included.

Any vegetable milk may be used as long as it is made from vegetable substances. For example, it may be made from vegetable milk powder dissolved in water or the like, plant extracts (which may be a solid or liquid) dissolved in water or the like, and plant proteins (which may be a solid or liquid) dissolved in water or the like, plus additives if necessary. When selecting a vegetable substance, the protein content may be used as an index.

(Soy Milk)

The soy milk in the present invention includes soy milk, adjusted soy milk, and soy milk beverages in accordance with the JAS standards. That is, the soy milk in the present invention refers to a milky beverage obtained by leaching protein and other components from soybeans with hot water or the like and removing fibers (referred to as "soybean milk liquid"), and includes (unadjusted) soy milk having a soybean solid content of 8% or more, adjusted soy milk having a soybean solid content of 6% or more, soy milk beverages (fruit juice-based) having a soybean solid content of 2% or more, and other soy milk beverages having a soybean solid content of 4% or more. These may be used in combination.

The soybean solid content in soy milk is preferably from 2 to 30% by mass, more preferably from 2 to 20% by mass, and even more preferably from 5 to 15% by mass.

If the content is below the lower limit, the soy milk fermented product may not solidify easily and water separation may increase.

If the content exceeds the upper limit, the soy milk fermented product may not be smooth enough or the soymilk fermented product may become too solid.

The soy milk fermented product of the present invention means solid and gel-like products (for example, yogurt), but when it is a soy milk fermented beverage made from a soy milk fermented product, the above soybean solid content may be less than 5% by mass, less than 3% by mass, or less than 2% by mass.

<Optional Component>

Various components may be added to the vegetable milk fermented product of the present invention as necessary. Specific examples thereof include metal salts, various saccharides, ascorbic acid, and glycerin that contribute to the stabilization of the vegetable milk fermented product, starch and dextrin as excipients for improving usability, inorganic salts having buffering effect, lactose, whey, and milk proteins that are milk-derived components, agar, gelatin and pectin that are gelling agents, water and extracts from plants (liquid, solid, powder) used to adjust the concentration of vegetable milk.

(Other Enzymes)

In the method for producing vegetable milk fermented product of the present invention, various enzyme products in liquid, powdered, or other forms may also be added. These enzyme products are not limited, but examples thereof are one or more selected from lactase, glucose isomerase, glucose oxidase, transglutaminase, lipase, second cellulase, amylase, inulinase, and second protease, which may be commercial products.

The above enzyme products should be added at substantially the same time as the P protease or T cellulase is added to soy milk.

The second cellulase that may be used in the present invention may be cellulases present in the animal and plant kingdoms. In particular, it is preferable to use cellulases derived from microorganisms, such as *Acetobacter, Pseudomonas, Aspergillus, Chaetomium, Fusarium, Penicillium, Neurospora, Pellicularia, Sporotrium, Stereum, Trichoderma, Trametes, Irpex, Corticium, Bacillus*, and *Paenibacillus* sp. Cellulases may be crude or purified and may be mixed with other enzymes such as hemicellulase. A plurality of cellulases may be mixed and used.

Examples of the second protease include proteases derived from microorganisms belonging to *Bacillus, Geobacillus, Aspergillus, Rhizopus, Rhizomucor*, and *Streptomyces* sp., and proteases derived from lactic acid bacteria. Specifically, preferred proteases are those derived from microorganisms selected from the group consisting of *Bacillus licheniformis, Bacillus subtilis, Bacillus amyloliquefaciens, Bacillus* sp., *Geoacillus caldoproteolyticus, Aspergillus* sp., *Aspergillus oryzae, Aspergillus melleus, Lactobacillus helveticus, Lactobacillus bulgaricus*, and *Streptococcus thermophilus.*

<<Properties of Vegetable Milk Fermented Product>>

<Evaluation of Texture>

The texture (smoothness and viscosity) and hardness (breaking strength analysis) of the vegetable milk fermented product obtained in the present invention can be evaluated based on the physical properties using a creep meter (RE2-33005C, manufactured by Yamaden Co., Ltd.)

(Smoothness)

"Smoothness" in texture can be evaluated based on the linearity of the waveform by creep meter. The less turbulent the waveform is (closer to a straight line), the smoother the texture is.

(Viscosity)

Viscosity (thread-forming property: texture analysis) can be evaluated visually and by the slope of the tangent line when the plunger rises, as described below. The smaller the slope of the tangent line, the more viscous and thicker the vegetable milk fermented product is, and the more cohesive sensation in the mouth the vegetable milk fermented product is likely to have.

(Hardness)

The hardness of the vegetable milk fermented product obtained in the present invention can be evaluated by the breaking strength analysis described below. As a specific physical property value, when the plunger is pushed down by a creep meter without collapsing the curd, the hardness of the curd can be evaluated by using the load (N) at the point when the curd collapses as the "breaking point" (a value automatically calculated by the creep meter).

<Method for Producing Vegetable Milk Fermented Product>>

The method for producing a vegetable milk fermented product of the present invention is not limited as to the specific production method, as long as it includes a first step of mixing vegetable milk and lactic acid bacteria to obtain a mixed liquid, and then a second step of fermenting the mixed liquid, in which before the second step is completed, a step of adding P protease or a protease from *Trichoderma* sp. to the raw milk and/or the mixed liquid (protease addition step) or a step of adding a cellulase from *Trichoderma* sp. (cellulase addition step) is included. For example, the production method includes the following steps: (1) simultaneously adding a lactic acid bacteria starter and P protease, a protease from *Trichoderma* sp. or T cellulase at predetermined concentrations to vegetable milk such as soy milk; (2) stirring at 43° C. for about 10 to 15 minutes; (3) dispensing the obtained mixed liquid into a glass container and allowing it to ferment at 43° C. for 4 to 6 hours or 4 to 5 hours; and (4) refrigerating the obtained vegetable milk fermented product such as soy milk fermented product at 4 to 5° C. for 1 day or more.

<<Applications of Vegetable Milk Fermented Product>>

The vegetable milk fermented product may be crushed and liquefied as a vegetable milk fermented beverage.

EXAMPLES

Hereinafter, the present invention will be described with reference to Examples (Production Examples) and Comparative Examples, but the present invention is not limited to these Examples (Production Examples) and Comparative Examples.

Production of Soy Milk Fermented Product

Production Example 1

Materials

Soy milk: organic adjusted soy milk (manufactured by Sujahta Meiraku Group, soybean solid content 10% by mass)

P protease: *Paenibacillus polymyxa* NBRC 15309 strain was inoculated into Nutrient liquid medium (manufactured by Difco), and cultured at 30° C. for 2 days. The culture medium was centrifuged at 10000 g for 10 minutes and the supernatant was desalted by dialysis. The protease had the properties (a) to (f) described above.

Lactic acid bacteria starter: *Lactobacillus* powder FD-DVS YF-L812 Yo-Flex (manufactured by Chr. Hansen Holding A/S: a mixture of *Lactobacillus delbrueckii* subsp, and *Streptococcus thermophilus*)

*Bifidobacterium: Bifidobacterium animalis* ssp. *lactis* BB12 strain (manufactured by Chr. Hansen Holding A/S)

Production Method

Soy milk was placed in a sterilized glass container and the lactic acid bacteria starter YF-L812*, bifidobacterium* BB12, and P protease were added simultaneously. Based on soy milk, the starter addition concentration was 0.1 mg/g, the BB 12 addition concentration was 0.05 mg/g, and the neutral protease addition concentration was 1.0 (PU/g) (all final concentrations). The soy milk with the starter, BB12, and P protease was stirred in a thermostatic water bath at 43° C. for 10 to 15 minutes. It was then dispensed into glass containers (manufactured by Toyo Glass Co., Ltd., 90 mL capacity) and fermented at 43° C. for 5 hours. The fermented preparation was refrigerated (from 4 to 5° C.) for one day or more to obtain a soy milk fermented product of Production Example 1.

No separate enzyme inactivation step was performed in the above production method.

Production Example 2

A soy milk fermented product of Production Example 2 was obtained in the same manner as in Production Example 1, except that the soy milk used was unadjusted soy milk (manufactured by Marusan-Ai Co., Ltd., soybean solid content 9% by mass).

Production Example 3

A soy milk fermented product of Production Example 3 was obtained in the same manner as in Production Example 1, except that the soy milk used was adjusted soy milk (manufactured by Kikkoman Corporation, soybean solid content 8% by mass or more).

Production Example 4

A soy milk fermented product of Production Example 4 was obtained in the same manner as in Production Example 1, except that the soy milk used was unadjusted soy milk (manufactured by Fukuren Inc., soybean solid content 9% by mass).

Soy milk fermented products of Production Examples 5 to 8 were prepared in the same manner as in Production Examples 1 to 4, except that FD-DVS YC-380 Yo-Flex (manufactured by Chr. Hansen Holding A/S: a mixture of *Lactobacillus delbrueckii* subsp, and *Streptococcus thermophilus*) was used as the lactic acid bacteria starter.

Comparative Examples 1 to 8

Soy milk fermented products of Comparative Examples 1 to 8 were obtained in the same manner as in Production Examples 1 to 8, except that P protease was not added.

Evaluation

Test Example 1 (Appearance of Soy Milk Fermented Product)

The appearance of the soy milk fermented products in Production Examples 1 to 8 and Comparative Examples 1 to 8 was visually checked. A number of irregularly shaped granular substances (hereafter may be referred to as lumps) were observed in the soy milk fermented products of Comparative Examples 1 to 8. On the other hand, the soy milk fermented products of Production Examples 1 to 8 existed in a smooth state, and few irregularly shaped granular products could be seen.

Figure 2:
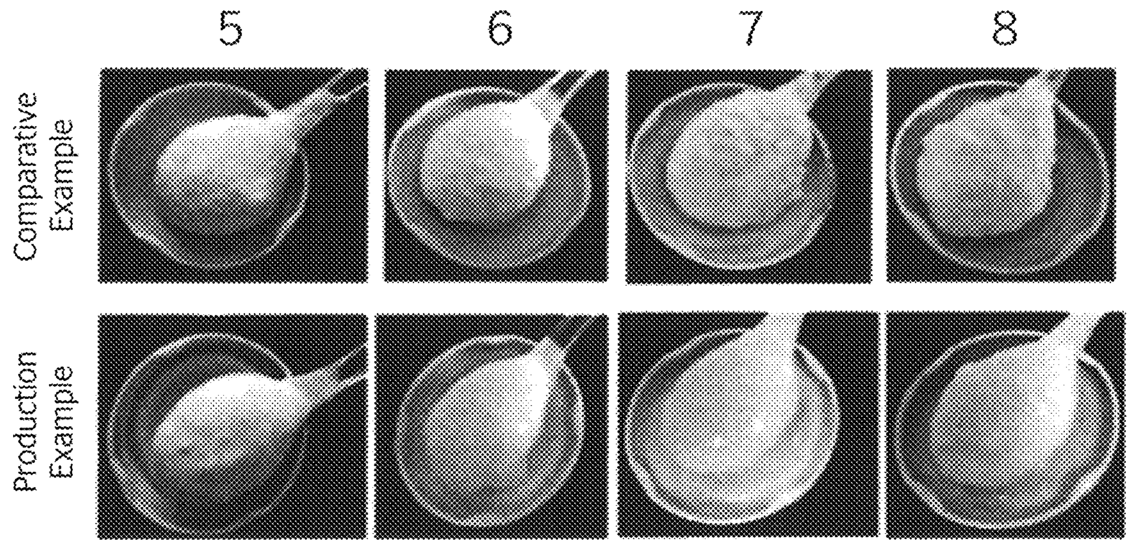
FIG. 2 shows photographs of the appearance of the soy milk fermented products of Production Examples 5 to 8 and Comparative Examples 5 to 8 when they were scooped out with a spoon after stirring.

The appearance photographs of the soy milk fermented products of Production Examples 1 to 8 and Comparative Examples 1 to 8 when they were stirred until uniform and then scooped out with a spoon are shown in FIG. 1 (Production Examples 1 to 4 and Comparative Examples 1 to 4) and FIG. 2 (Production Examples 5 to 8 and Comparative Examples 5 to 8).

Test Example 2 (Evaluation of Physical Properties for Texture)

(Analysis of Breaking Strength)

Figure 3:
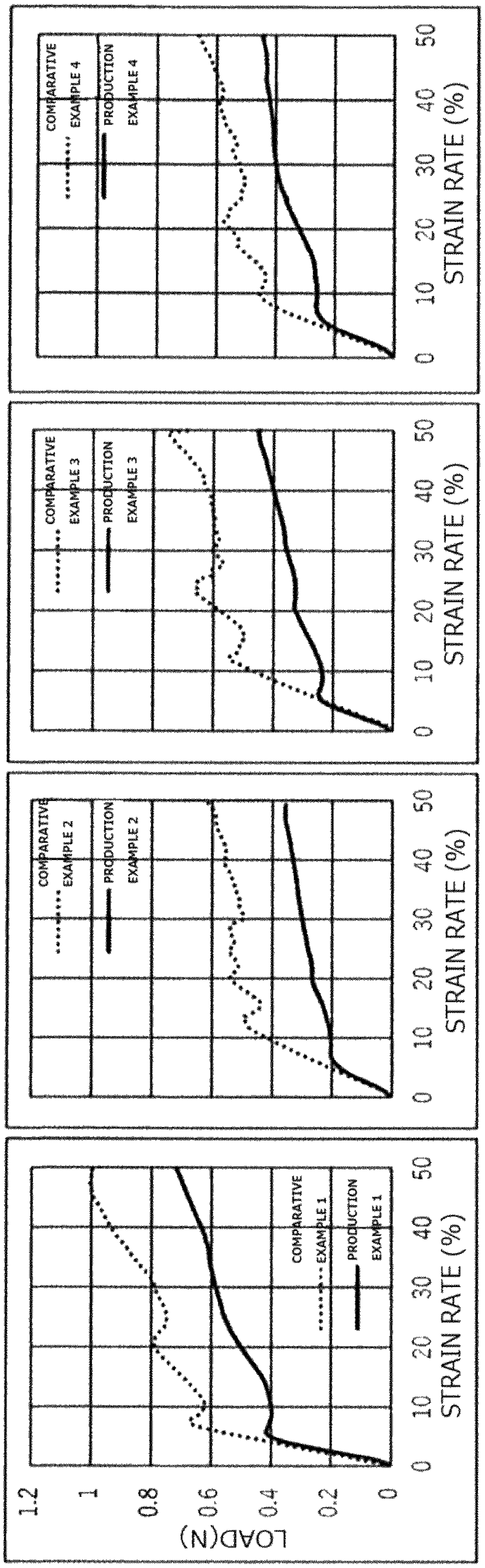
FIG. 3 shows the results of the breaking strength analysis of the soy milk fermented products of Production Examples 1 to 4 and Comparative Examples 1 to 4.
Figure 4:
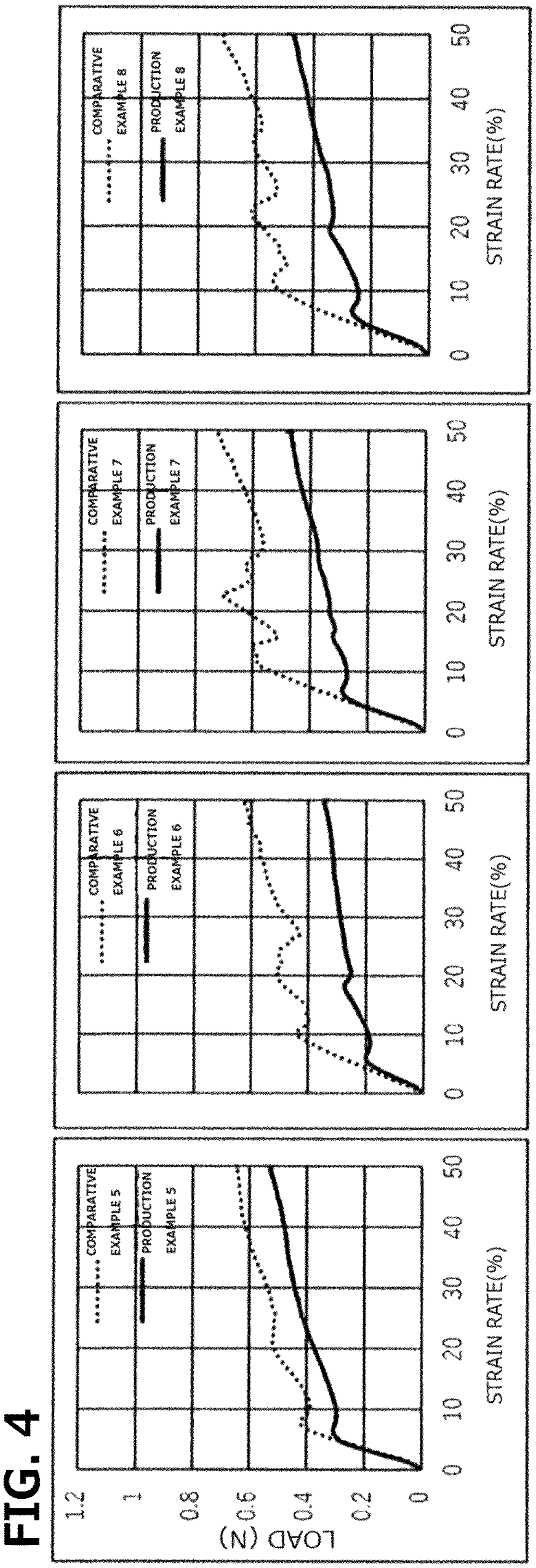
FIG. 4 shows the results of the breaking strength analysis of the soy milk fermented products of Production Examples 5 to 8 and Comparative Examples 5 to 8.

Physical properties of the soy milk fermented products of Production Examples 1 to 8 and Comparative Examples 1 to 8 were measured. The physical properties were measured using a creep meter (RE2-33005C) manufactured by Yamaden Co., Ltd. The breaking strength analysis was performed without collapsing the curd. The results of Production Examples 1 to 4 and Comparative Examples 1 to 4 are shown in FIG. 3, and those of Production Examples 5 to 8 and Comparative Examples 5 to 8 are shown in FIG. 4. In the breaking strength analysis, the press-in speed of the plunger was set to 1 mm/s, the sample thickness to 30 mm, the plunger shape to a cylinder of 16 mm diameter (Jig No. 3), the measurement strain rate to 50%, and the load cell standard to 2 N.

As shown in FIGS. 3 and 4, the load (stress) on the breakage of the soy milk fermented product decreases with the addition of P protease, indicating that the surface and the entire surface of the soy milk fermented product became softer. The soy milk fermented products of Comparative Examples 1 to 8 without enzyme addition are harder than the Production Examples, indicating uneven hardness inside the curd (uneven waveform of dotted line). On the other hand, the addition of P protease reduced the unevenness of hardness inside the curd (the waveform of solid line), which can be interpreted as a smoother texture.

(Texture Analysis)

Figure 5:
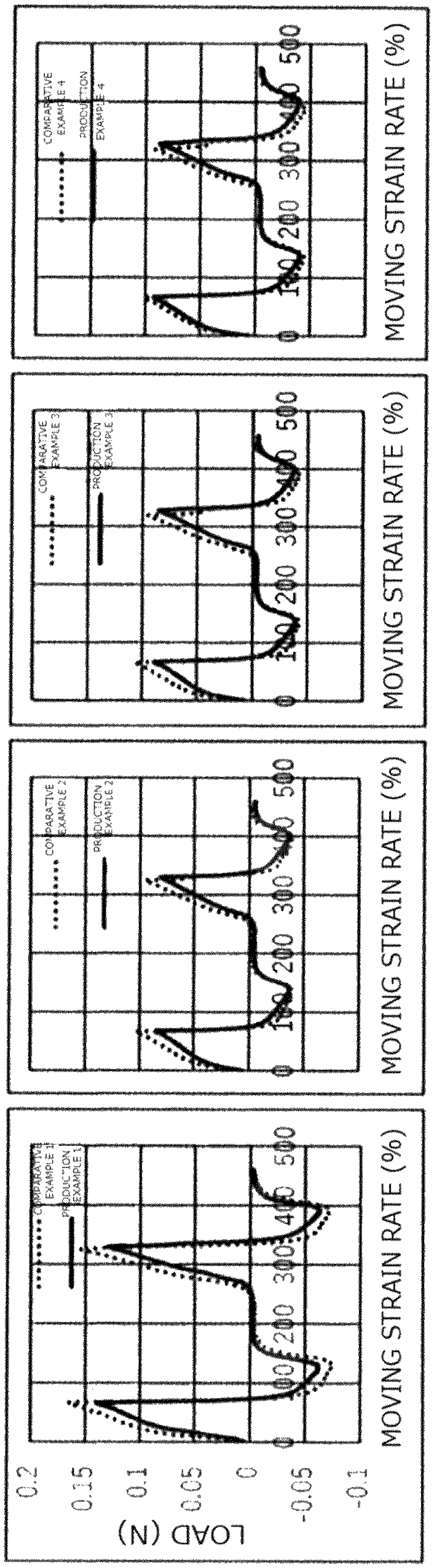
FIG. 5 shows the results of the texture analysis of the soy milk fermented products of Production Examples 1 to 4 and Comparative Examples 1 to 4.
Figure 6:
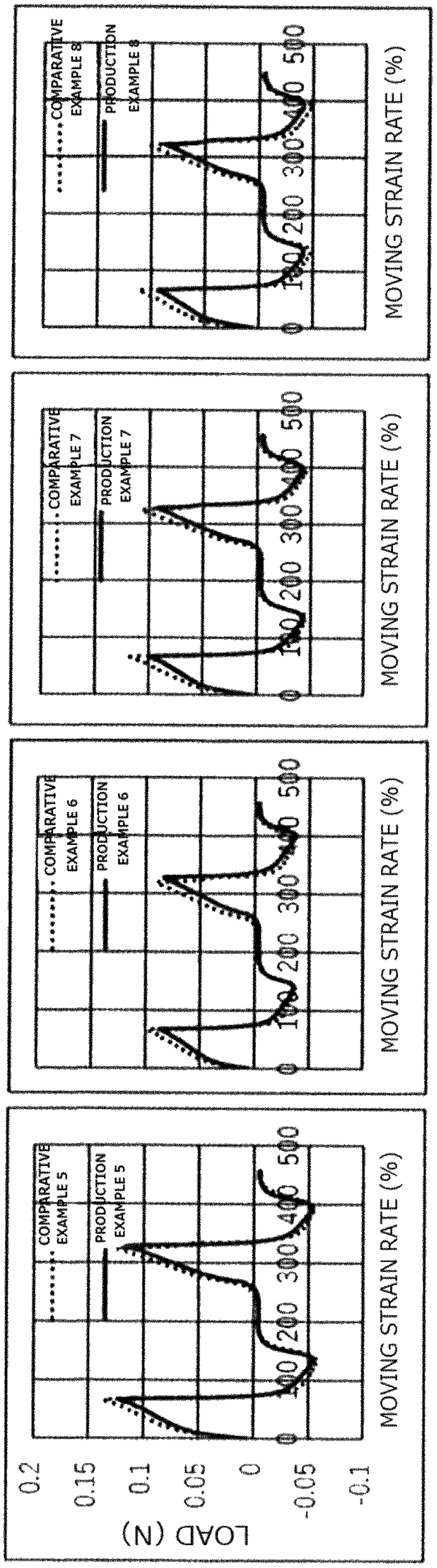
FIG. 6 shows the results of the texture analysis of the soy milk fermented products of Production Examples 5 to 8 and Comparative Examples 5 to 8.

Texture analysis was performed by stirring the soy milk fermented product with a spoon and then placing it in a special cup. The stirring was performed until the size of the lumps became no smaller with stirring. In the breaking strength analysis, the press-in speed of the plunger was set to 5 mm/s, the sample thickness to 15 mm, the plunger shape to a cylinder of 16 mm diameter, the measurement strain rate to 66.66%, and the load cell standard to 2 N. In the texture analysis under this setting, the plunger was inserted 10 mm into the curd, followed by raising the plunger, and the change in load on the plunger was measured. The results of Production Examples 1 to 4 and Comparative Examples 1 to 4 are shown in FIG. 5, and those of Production Examples 5 to 8 and Comparative Examples 5 to 8 are shown in FIG. 6. The load increased with the insertion of the plunger and showed negative values as the plunger was raised.

When P protease was added, adhesiveness (area under a load of zero or less) was reduced as compared with no enzyme addition.

Test Example 3 (Evaluation of Water Separation Rate)

The soy milk fermented products of Production Examples 1 to 8 and Comparative Examples 1 to 8 were stirred with a spoon, and then 5 g of the soy milk fermented product was dispensed into a 15-mL graduated tube with screw cap, and centrifuged at 3600 rpm/min (H-19F MR, manufactured by KOKUSAN Co., Ltd.) at 4° C. for 10 minutes. The mass of separated water content was then measured, and the water separation rate was calculated using the following formula.

$$\text{Water separation rate (\%)}=(\text{mass of separated water content}/\text{sample mass})\times 100$$

After obtaining the water separation rate by the above method, the water separation rate of Production Example was divided by the water separation rate of Comparative Example, and then multiplied by 100 to obtain the water separation suppression effect (%) by Production Example.

The obtained results are shown in Table 1. The addition of P protease resulted in a lower water separation rate of the soy milk fermented products of Production Examples. The water separation suppression by Production Examples ranged from about 40% to 60%. It was a surprising effect that the use of P protease in the production of soy milk fermented products suppressed water separation.

TABLE 1

| | Water separation rate (%) | | Water separation |
|---|---|---|---|
| | Production Example | Comparative Example | suppression effect by Production Example (%) |
| Example 1 | 20.8 | 11.8 | 56.7 |
| Example 2 | 33.6 | 14.5 | 43.2 |
| Example 3 | 34.9 | 16.3 | 46.7 |
| Example 4 | 30.7 | 13.6 | 44.3 |
| Example 5 | 19.5 | 12.5 | 64.1 |
| Example 6 | 31.7 | 14.4 | 45.4 |
| Example 7 | 34.1 | 19.3 | 56.6 |
| Example 8 | 30.9 | 19.4 | 62.8 |

Test Example 4 (Evaluation of Fermentation Acceleration Action)

Figure 7:
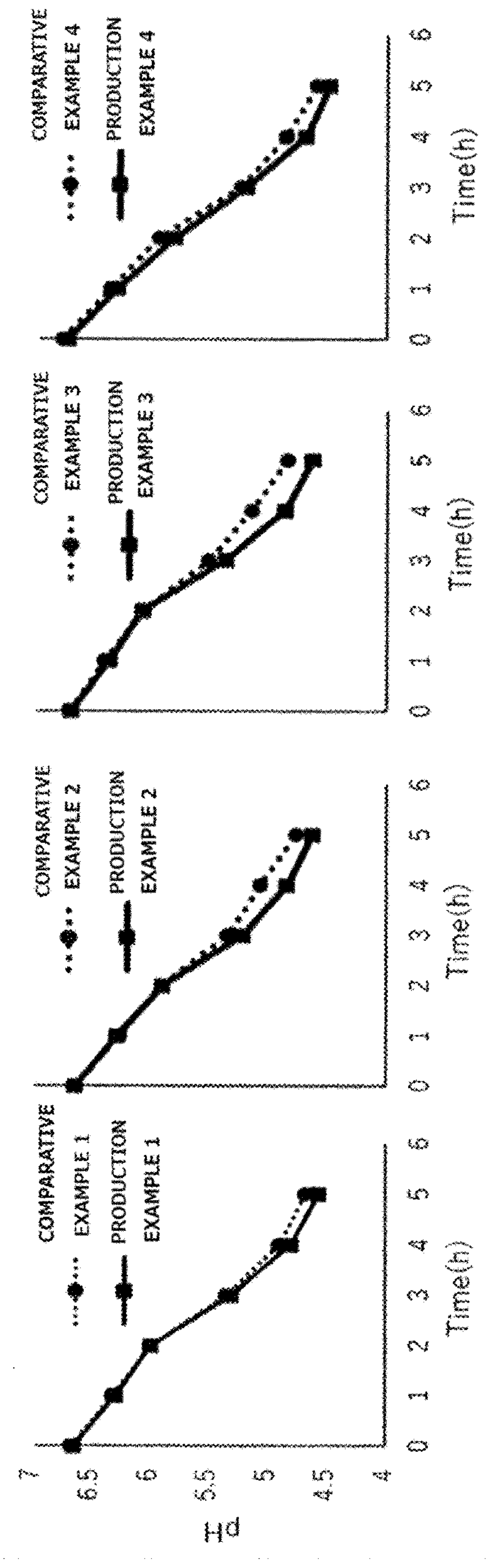
FIG. 7 shows the fermentation progress of the soy milk fermented products of Production Examples 1 to 4 and Comparative Examples 1 to 4.
Figure 8:
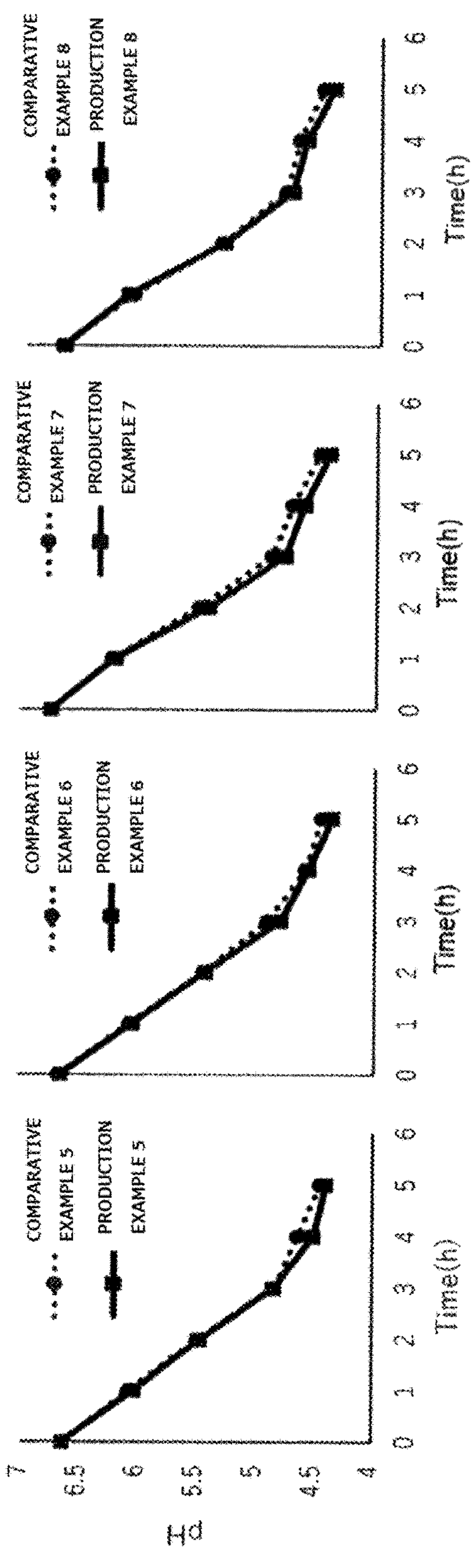
FIG. 8 shows the fermentation progress of the soy milk fermented products of Production Examples 5 to 8 and Comparative Examples 5 to 8.

The pH was measured every hour during the production of the soy milk fermented products of Production Examples 1 to 8 and Comparative Examples 1 to 8. The fermentation progress of Production Examples 1 to 4 and Comparative Examples 1 to 4 are shown in FIG. 7, and those of Production Examples 5 to 8 and Comparative Examples 5 to 8 are shown in FIG. 8.

The tendency for the pH to decrease more easily was confirmed in the soy milk fermented products of Production Examples 1 to 8 using P protease. In all cases, the fermentation time was shortened by 30 minutes to 1 hour.

Test Example 5 (Sensory Evaluation)

Sensory evaluation of the soy milk fermented products of Production Examples 1 to 8 and Comparative Examples 1 to 8 was performed. The evaluators were six persons involved in the research and development of soy milk fermented products. The soybean smell, sourness, and smoothness were evaluated on a four-point scale as shown below. The average value was determined. The obtained results are shown in Table 2 (Production Examples 1 to 4 and Comparative Examples 1 to 4) and Table 3 (Production Examples 5 to 8 and Comparative Examples 5 to 8).

1: Not perceived or slightly perceived
2: Slightly perceived
3: Perceived
4: Strongly perceived

TABLE 2

| | Comparative Example | Production Example | Comparative Example | Production Example | Comparative Example | Production Example | Comparative Example | Production Example |
|---|---|---|---|---|---|---|---|---|
| Soybean color | 2.6 | 1.6 | 1.8 | 1.2 | 1.8 | 1.4 | 2.4 | 1.8 |
| Sourness | 2.0 | 2.4 | 1.4 | 2.6 | 1.2 | 2.8 | 1.8 | 2.4 |
| Smoothness | 1.0 | 3.4 | 1.0 | 3.2 | 1.0 | 3.2 | 1.2 | 2.8 |
| Comment | Green smell Unpalatable | Smooth No soybean smell Non-fat fermented milk-like | Crumbly Tofu-like | Smooth Mild taste Thick Creamy | Green smell Ambiguous taste | Smooth Savory | Crumbly | Rich Smooth Strongly Cream |

TABLE 3

| | Comparative Example | Production Example | Comparative Example | Production Example | Comparative Example | Production Example | Comparative Example | Production Example |
|---|---|---|---|---|---|---|---|---|
| Green smell | 2.2 | 1.6 | 1.4 | 1.2 | 1.8 | 1.4 | 1.8 | 1.5 |
| Sourness | 1.4 | 2.0 | 1.4 | 2.2 | 1.6 | 2.2 | 1.6 | 1.0 |
| Smoothness | 1.0 | 3.0 | 1.0 | 3.2 | 1.0 | 2.8 | 1.2 | 3.0 |
| Comment | Green smell Unpalatable | Smooth Tasty | Large and small lumps Crumbly | Smooth Tasty | Crumbly | Smooth Creamy Tasty | Large and small lumps | Smooth Slight soybeam smell |

Preparation of soy milk fermented products using P protease was shown to reduce soybean and green smells in addition to improving sourness. The soy milk fermented product did not cause bitterness, and received numerous evaluations as tasty. Some also commented that they were fluffy and light on the palate.

A large number of irregularly shaped granular matter (lumps) were observed from the appearance of the soy milk fermented product without P protease. The soy milk fermented product was found to have a rough texture in the mouth. The soy milk fermented product with P protease was not found to have a rough texture, and was confirmed to have smooth properties and good texture and mouth feel.

Reference Example 1

A soy milk fermented product of Reference Example 1 was obtained in the same manner as in Production Example 1, except that cellulase (product name: Cellulase F, manufactured by Godo Shusei Co., Ltd.) was added simultaneously together with P protease.

Cellulase F was added at 1% (v/w) (1 U/g or more as FPase, 22 U/g or more as CMCase, and 3.4 PU/g as protease activity, all at final concentration).

CMCase was determined in the same manner except that 5 mg of sodium carboxymethylcellulose was used instead of 50 mg of a piece of cellulose filter paper, which was a substrate when 1 FP unit was determined.

Comparative Example 9

A soy milk fermented product of Comparative Example 9 was obtained in the same manner as in Reference Example 1, except that P protease and cellulase were not added.

Test Example 6 (Evaluation of Fermentation Acceleration Action when Cellulase was Added in Combination)

Figure 9:
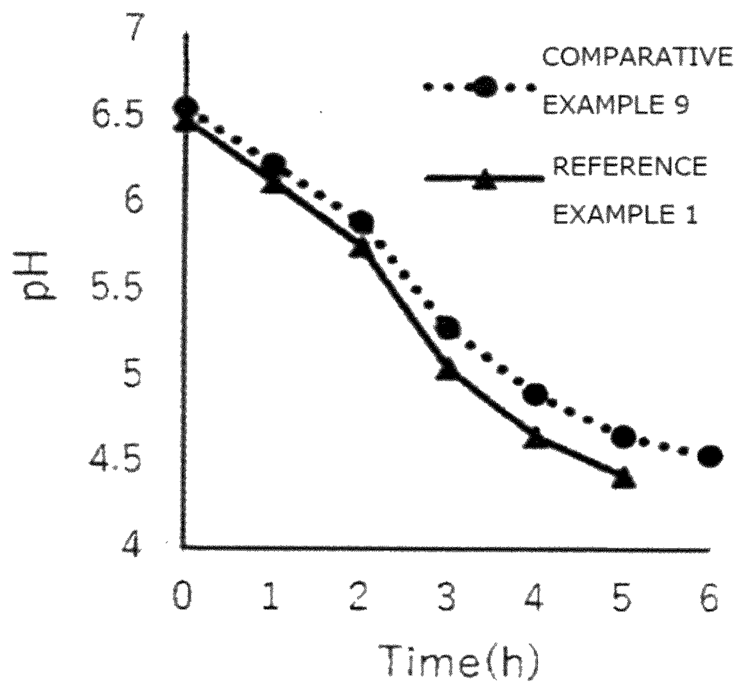
FIG. 9 shows the fermentation progress of the soy milk fermented products of Reference Example 1 and Comparative Example 9.

The pH was measured every hour until the soy milk fermented products of Reference Example 1 and Comparative Example 9 were produced. The fermentation progress is shown in FIG. 9.

The fermentation was accelerated for 30 minutes or less when P protease was added alone (FIG. 7 left), but the fermentation was accelerated for 1 hour in the soy milk fermented product of Reference Example 1 in which Cellulase F was also added. However, in the soy milk fermented product of Reference Example 1, bitterness was caused due to the high amount of Cellulase F added to the protein in the soy milk used. The reason for this is assumed to be that the protein content of the soy milk used in Reference Example 1 (5.0% (w/v)) was higher than that of the soy milk used in the other Production Examples, and that the soy milk used in Reference Example 1 contained 0.002% gamma-aminobutyric acid (GABA), so the soy milk fermented product of Reference Example 1 behaved differently from other soy milk fermented products. When using such soy milk, by lowering the addition concentration of cellulase or shortening the reaction time, it is expected to obtain a soy milk fermented product that does not cause bitterness while maintaining the fermentation acceleration effect of cellulase and P protease.

Production Example 9

A soy milk fermented product of Production Example 9 was obtained in the same manner as in Production Example 3.

Production Example 10

A soy milk fermented product of Production Example 10 was obtained in the same manner as in Production Example 9, except that T cellulase (product name: Cellulase F, manufactured by Godo Shusei Co., Ltd.) was added instead of P protease at 1.0% (1 U/g or more as FPase, 22 U/g or more as CMCase, and 3.4 PU/g or more as protease activity, all at final concentration).

Production Example 11

A soy milk fermented product of Production Example 11 was obtained in the same manner as in Production Example 9, except that T cellulase (product name: Cellulase F, manufactured by Godo Shusei Co., Ltd.) was added at 1.0% together with P protease.

Comparative Example 10

A soy milk fermented product of Comparative Example 10 was obtained in the same manner as in Production Example 9, except that P protease was not added.

Evaluation

The soy milk fermented products of Production Examples 9 to 11 and Comparative Example 10 were subjected to breaking strength analysis as in Test Example 2, water separation rate evaluation as in Test Example 3, and fermentation acceleration action evaluation as in Test Example 4. The results are shown in FIGS. 10 to 12.

Figure 10:
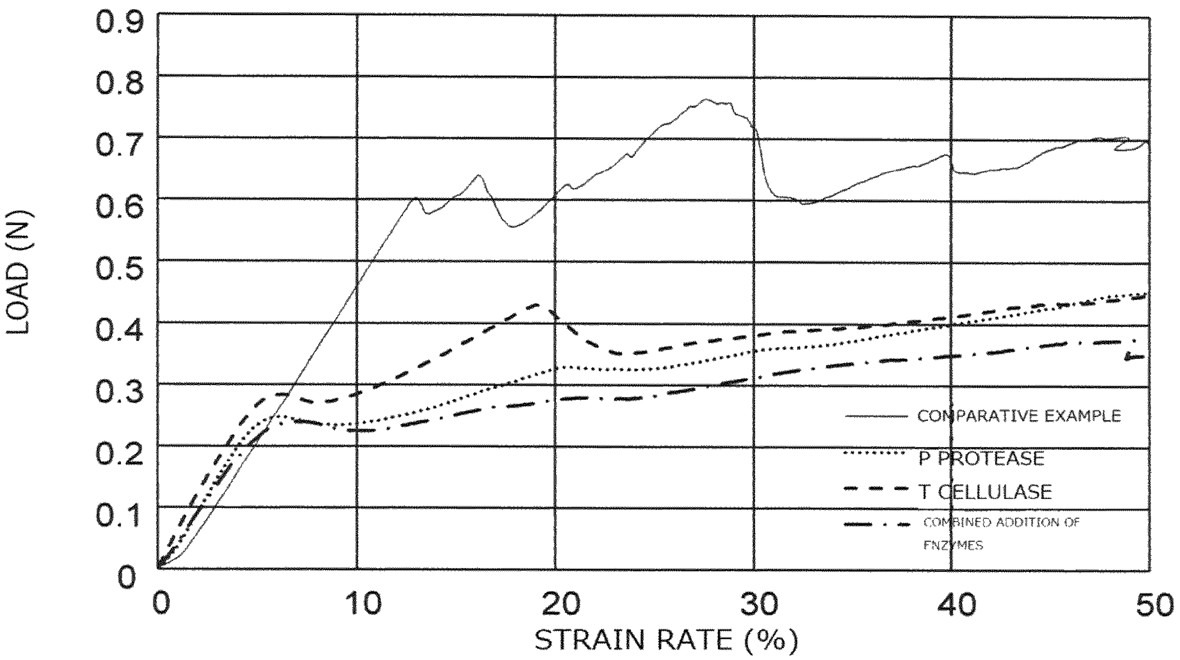
FIG. 10 shows the results of the breaking strength analysis of the soy milk fermented products of Production Examples 9 to 11 and Comparative Example 10.

As shown in FIG. 10, the improvement in smoothness of the soy milk fermented products was higher in the following order: combined addition of P protease and T cellulase (enzyme combination), addition of T cellulase, and addition of P protease.

Figure 11:
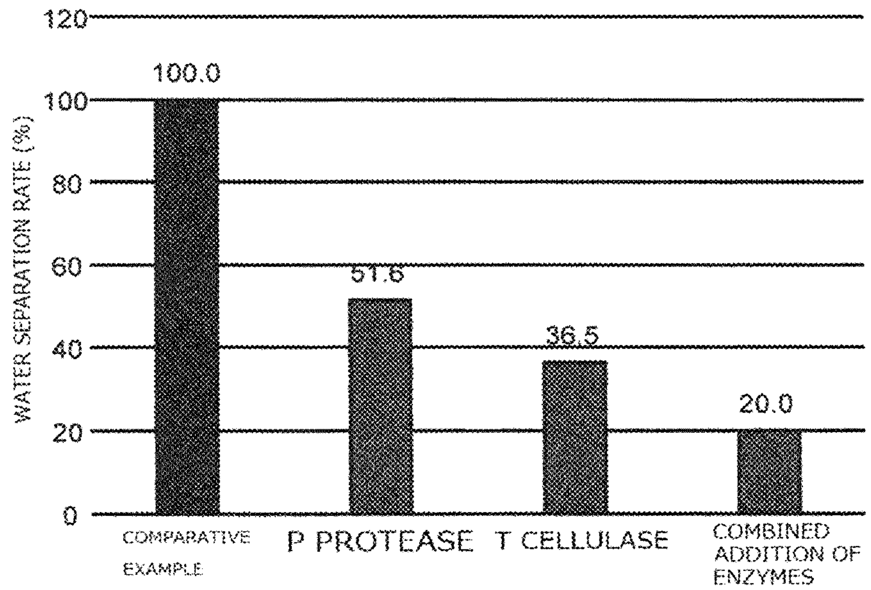
FIG. 11 shows the evaluation results of the water separation rate of the soy milk fermented products of Production Examples 9 to 11 and Comparative Example 10.

As shown in FIG. 11, the water separation suppression effect for the soy milk fermented products was higher in the following order: combined addition of P protease and T cellulase, addition of T cellulase, and addition of P protease.

Figure 12:
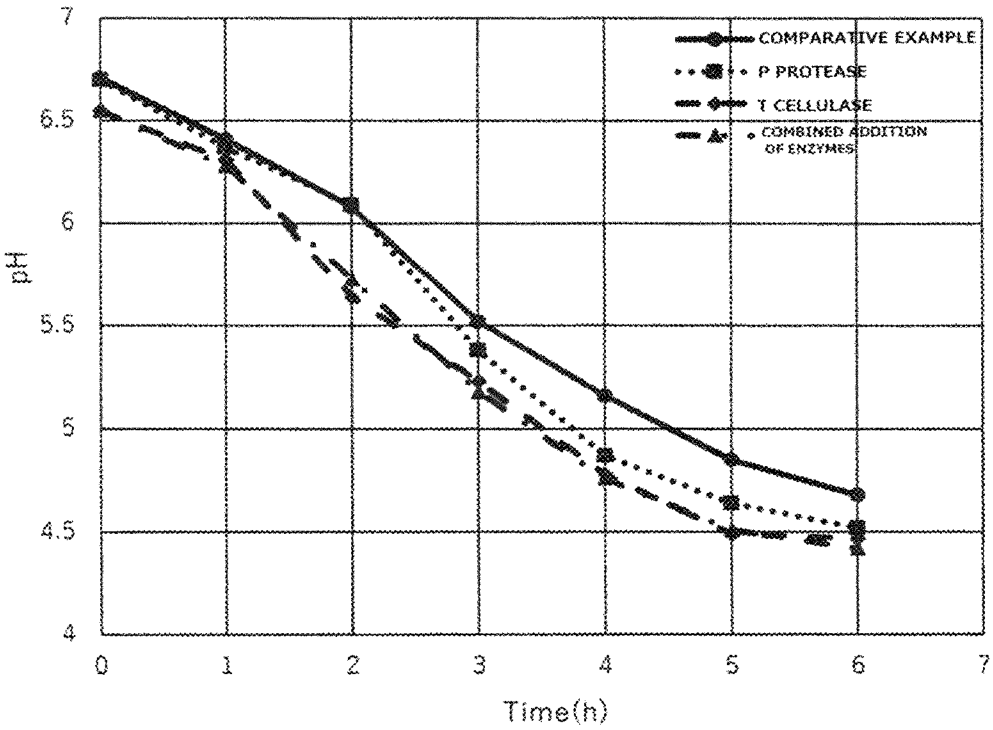
FIG. 12 shows the fermentation progress of the soy milk fermented products of Production Examples 9 to 11 and Comparative Example 10.

As shown in FIG. 12, the fermentation was accelerated for 1.5 hours by the combined addition of P protease and T cellulase and the addition of T cellulase. The addition of P protease was found to accelerate the fermentation for 1 hour.

The addition of P protease alone, the combined addition of P protease and T cellulase, and the addition of T cellulase alone reduced the soybean smell and did not produce bitterness.

Production Example 12

A soy milk fermented product of Production Example 12 was obtained in the same manner as in Production Example 2.

Production Examples 13 to 15

Soy milk fermented products of Reference Examples 13 to 15 were obtained in the same manner as in Production Example 12, except that T cellulase (product name: Cellulase F, manufactured by Godo Shusei Co., Ltd.) was added at 0.1%, 0.5%, and 1% instead of P protease.

Production Example 16

A soy milk fermented product of Production Example 16 was obtained in the same manner as in Production Example 12, except that T cellulase was added at 1.0% together with P protease.

Comparative Example 11

A soy milk fermented product of Comparative Example 11 was obtained in the same manner as in Production Example 12, except that P protease and T cellulase were not added.

Evaluation

The soy milk fermented products of Production Examples 12 to 16 and Comparative Example 11 were subjected to breaking strength analysis as in Test Example 2, water separation rate evaluation as in Test Example 3, fermentation acceleration action evaluation as in Test Example 4, and sensory evaluation as in Test Example 5. The results are shown in FIGS. 13 to 15.

Figure 13:
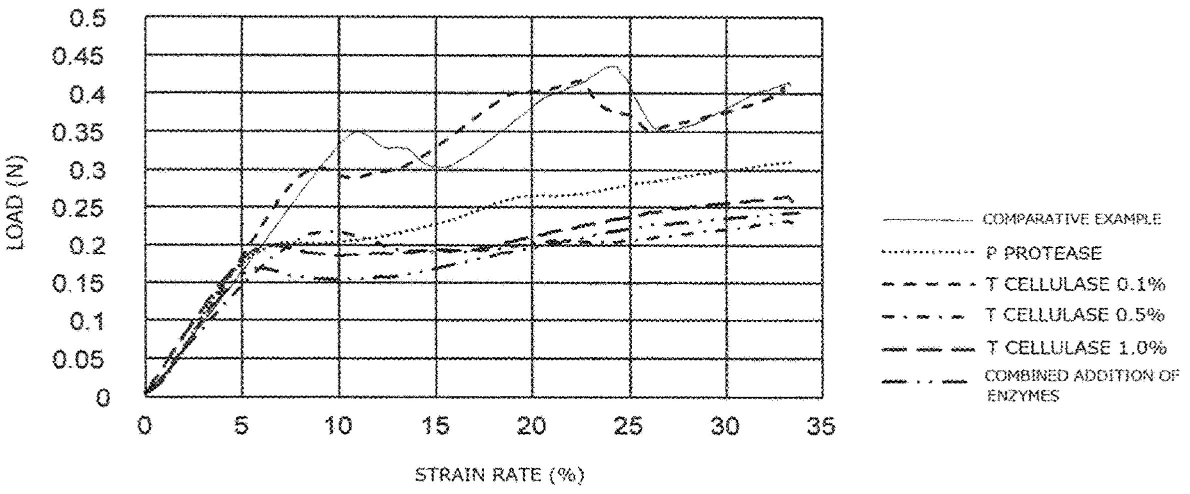
FIG. 13 shows the results of the breaking strength analysis of the soy milk fermented products of Production Examples 12 to 16 and Comparative Example 11.

As shown in FIG. 13, the improvement in smoothness of the soy milk fermented products was higher in the following order: combined addition of P protease and T cellulase, 1.0% addition of T cellulase, 0.5% addition of T cellulase, and addition of P protease.

Figure 14:
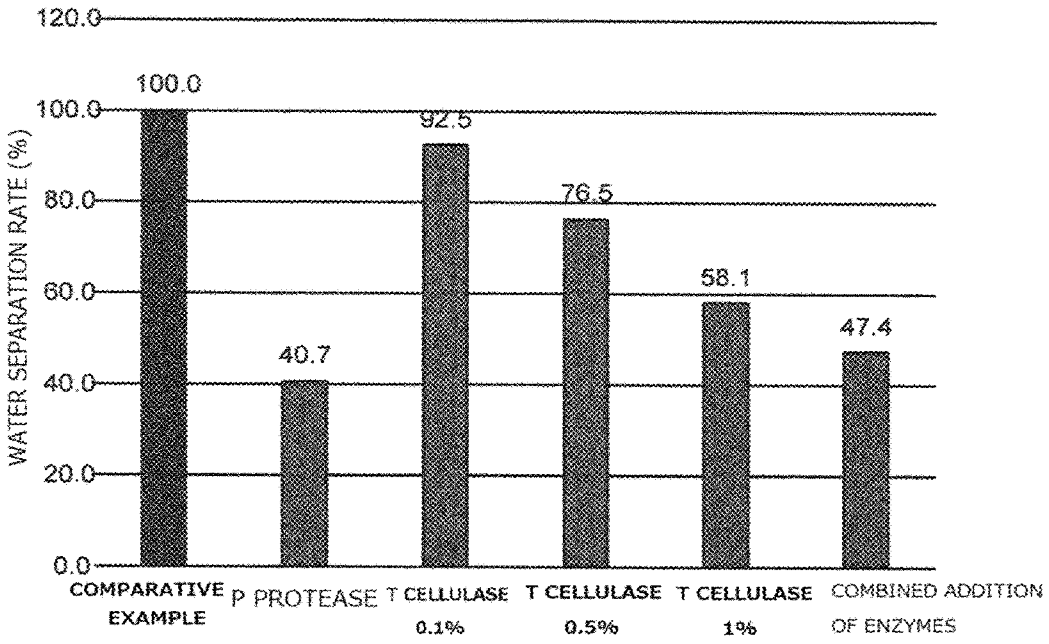
FIG. 14 shows the evaluation results of the water separation rate of the soy milk fermented products of Production Examples 12 to 16 and Comparative Example 11.

As shown in FIG. 14, the water separation suppression effect for the soy milk fermented products was higher in the following order: addition of P protease, combined addition of P protease and T cellulase, 1.0% addition of T cellulase, 0.5% addition of T cellulase, and 0.1% addition of T protease.

Figure 15:
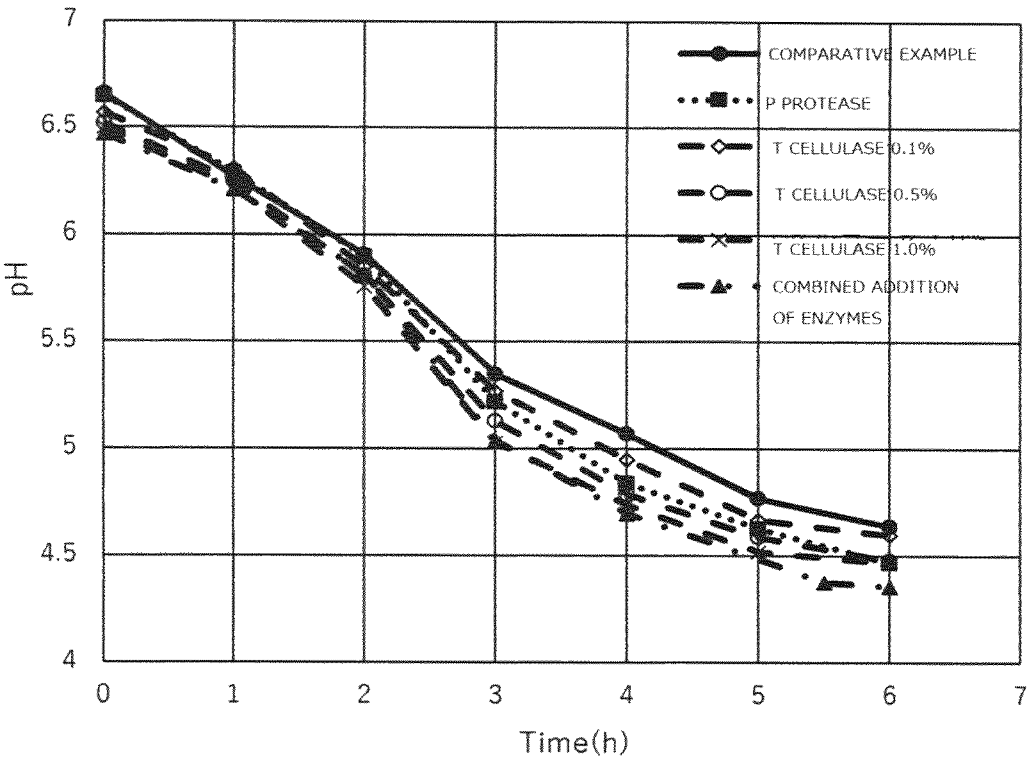
FIG. 15 shows the fermentation progress of the soy milk fermented products of Production Examples 12 to 16 and Comparative Example 11.

As shown in FIG. 15, the addition of P protease or 0.5% addition of T cellulase accelerated fermentation for 0.5 hour, and the 1.0% addition of T cellulase accelerated fermentation for 1 hour. The combined addition of P protease and 1% T cellulase accelerated fermentation for 1.5 hours.

The addition of P protease alone, the combined addition of P protease and T cellulase, and the addition of T cellulase alone reduced the soybean smell and did not produce bitterness.

<<Production of Almond Milk Fermented Product>>

Information on the almond milk used is as follows. Energy, protein and fat are all in 100 mL of almond milk.

TABLE 4

| Manufacture | Trade name | Energy (kcal) | Protein (g) | Lipid (g) | Almond base |
|---|---|---|---|---|---|
| Ezaki Gilco | Almond Effect (Sugar Free) | 19 | 0.5 | 1.5 | |

TABLE 4-continued

| Manufacture | Trade name | Energy (kcal) | Protein (g) | Lipid (g) | Almond base |
|---|---|---|---|---|---|
| Marusan-Ai | Everyday Delicious Roasted Almond Milk | 48 | 1.6 | 3.4 | Almond paste |
| Tsukuba | Aromatic Roasted | 62 | 3 | 5.2 | |
| Dairy | Mild Plane | 62 | 2.7 | 5.4 | Almond |
| Products (Thick Almond Milk) | Rich Plane | 75 | 3.2 | 6.6 | |

Production Example 17

Commercially available almond milk (product name: Almond Effect (sugar-free), manufactured by Ezaki Glico Co., Ltd.) was placed in a sterilized glass container, and a lactic acid bacteria starter YF-L812, *bifidobacterium* BB12, and P protease were added simultaneously. When almond milk was used as the standard, the concentrations of the starter, BB12, and P protease added were 0.1 mg/g, 0.05 mg/g, and 1.0 (PU/g), respectively (all at final concentration). The almond milk with the starter, BB12, and P protease was stirred in a thermostatic water bath at 43° C. for 10 to 15 minutes. It was then dispensed into glass containers (manufactured by Toyo Glass Co., Ltd., 90 mL capacity) and fermented at 43° C. for 8 hours. The fermented preparation was refrigerated (from 4 to 5° C.) for one day or more to obtain an almond milk fermented product of Production Example 17.

No separate enzyme inactivation step was performed in the above production method.

Production Example 18

An almond milk fermented product of Production Example 18 was obtained in the same manner as in Production Example 17, except that commercially available almond milk (product name: Everyday Delicious Roasted Almond Milk by Marusan-Ai Co., Ltd.) was used.

Comparative Example 12

An almond milk fermented product of Comparative Example 12 was obtained in the same manner as in Production Example 17, except that P protease was not added.

Evaluation

The results of the evaluation of the almond milk fermented products of Production Examples 17 to 18 are shown below. "Gel formation" in the table is based on the observation of the appearance of the almond milk fermented products, and other evaluation items were tested in accordance with the above-described Test Examples. The relative evaluation content indicates the content compared to the almond milk fermented product of Comparative Example 12. No bitterness was caused in any of the almond milk fermented products.

TABLE 5

| Production Example | Gel formation | Acceleration of fermentation | Breaking strength | Texture change | Water separation suppression effect | Evaluation by eating |
|---|---|---|---|---|---|---|
| 17 | None | Accelerated | No change | None | None | Less greasy. |
| 18 | None | for 1 hour Accelerated for 2 hour | No change | None | None | Slightly sour. Slightly smaller lumps. |

Production Example 19

Commercially available almond milk (product name: Thick Almond Milk (Aromatic Roasted), manufactured by Tsukuba Dairy Products Co., Ltd.) was placed in a sterilized glass container, and the lactic acid bacteria starter YF-L812, *bifidobacterium* BB12, and P protease and/or T cellulase were added simultaneously. When almond milk was used as the standard, the concentrations of the starter, BB12, P protease, and T cellulase added were 0.1 mg/g, 0.05 mg/g, 1.0 (PU/g), and 3.4 (PU/g), respectively (all at final concentration). In the system with P protease and T cellulase, P protease was added at 1.0 (PU/g) and T cellulase at 3.4 (PU/g) (both at final concentration). The almond milk with the starter, BB12, and P protease was stirred in a thermostatic water bath at 43° C. for 10 to 15 minutes. It was then dispensed into glass containers (manufactured by Toyo Glass Co., Ltd., 90 mL capacity) and fermented at 43° C. for 6 hours. The fermented preparation was refrigerated (from 4 to 5° C.) for one day or more to obtain an almond milk fermented product of Production Example 19.

No separate enzyme inactivation step was performed in the above production method.

Production Example 20

An almond milk fermented product of Production Example 20 was obtained in the same manner as in Production Example 19, except that commercially available almond milk (product name: Thick Almond Milk (Mild Plane), manufactured by Tsukuba Dairy Products Co., Ltd.) was used.

Production Example 21

An almond milk fermented product of Production Example 21 was obtained in the same manner as in Production Example 19, except that commercially available almond milk (product name: Thick Almond Milk (Rich Plane), manufactured by Tsukuba Dairy Products Co., Ltd.) was used.

Comparative Examples 13 to 15

An almond milk fermented product of Comparative Example 13 was obtained in the same manner as in Production Example 19, except that neither P protease, T cellulase, nor the combination of P protease and T cellulase was not added.

An almond milk fermented product of Comparative Example 14 was obtained in the same manner as in Production Example 20, except that neither P protease, T cellulase, nor the combination of P protease and T cellulase was not added.

An almond milk fermented product of Comparative Example 15 was obtained in the same manner as in Production Example 21, except that neither P protease, T cellulase, nor the combination of P protease and T cellulase was not added.

Evaluation

The almond milk fermented products of Production Example 19 to 21 and Comparative Example 13 to 15 were evaluated in the same manner as the soy milk fermented products. All almond milk fermented products were confirmed to gel. The almond milk fermented products of Production Examples 17 to 18 did not gel and gave different results. It was suggested that as the protein amount in the almond milk increases, the almond milk tends to gel. None of the products caused bitterness, suggesting that the amount of protein should be determined according to the application and purpose.

Figure 16:
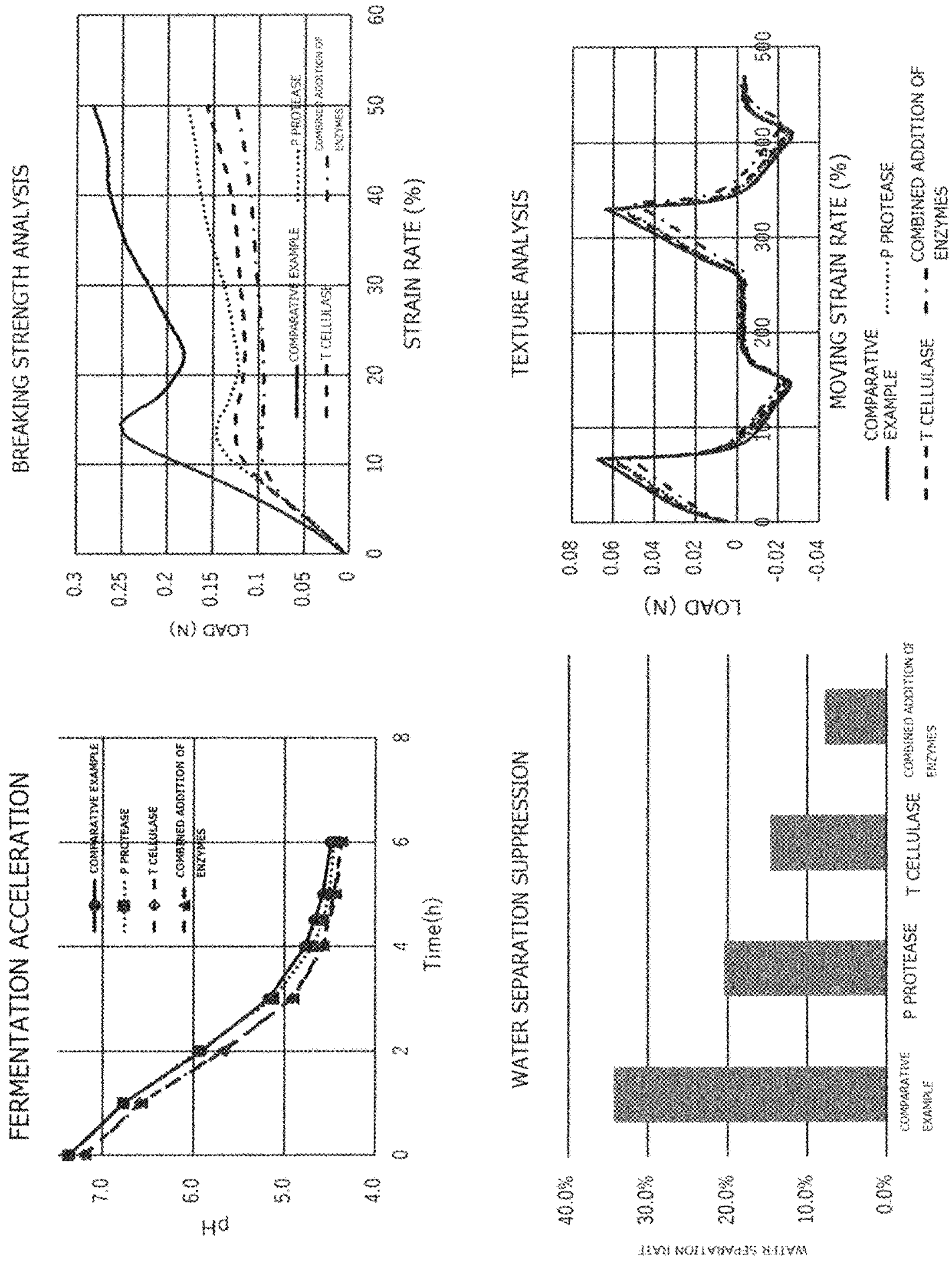
FIG. 16 shows the evaluation results of the fermentation progress (upper left), breaking strength analysis (upper right), water separation suppression (lower left), and texture analysis (lower right) of the almond milk fermented products of Production Example 19 and Comparative Example 13.

The results of Production Example 19 and Comparative Example 13 are shown in FIG. 16. The results of Production Example 20 and Comparative Example 14 are omitted because they were almost the same as in FIG. 16.

As shown in FIG. 16, it was confirmed that the addition of P protease or T cellulase decreased the water separation suppression effect and breaking strength. The effect was increased by the combined addition of P protease and T cellulase. The addition of T cellulase alone or in combination with P protease was found to be effective in accelerating fermentation.

Figure 17:
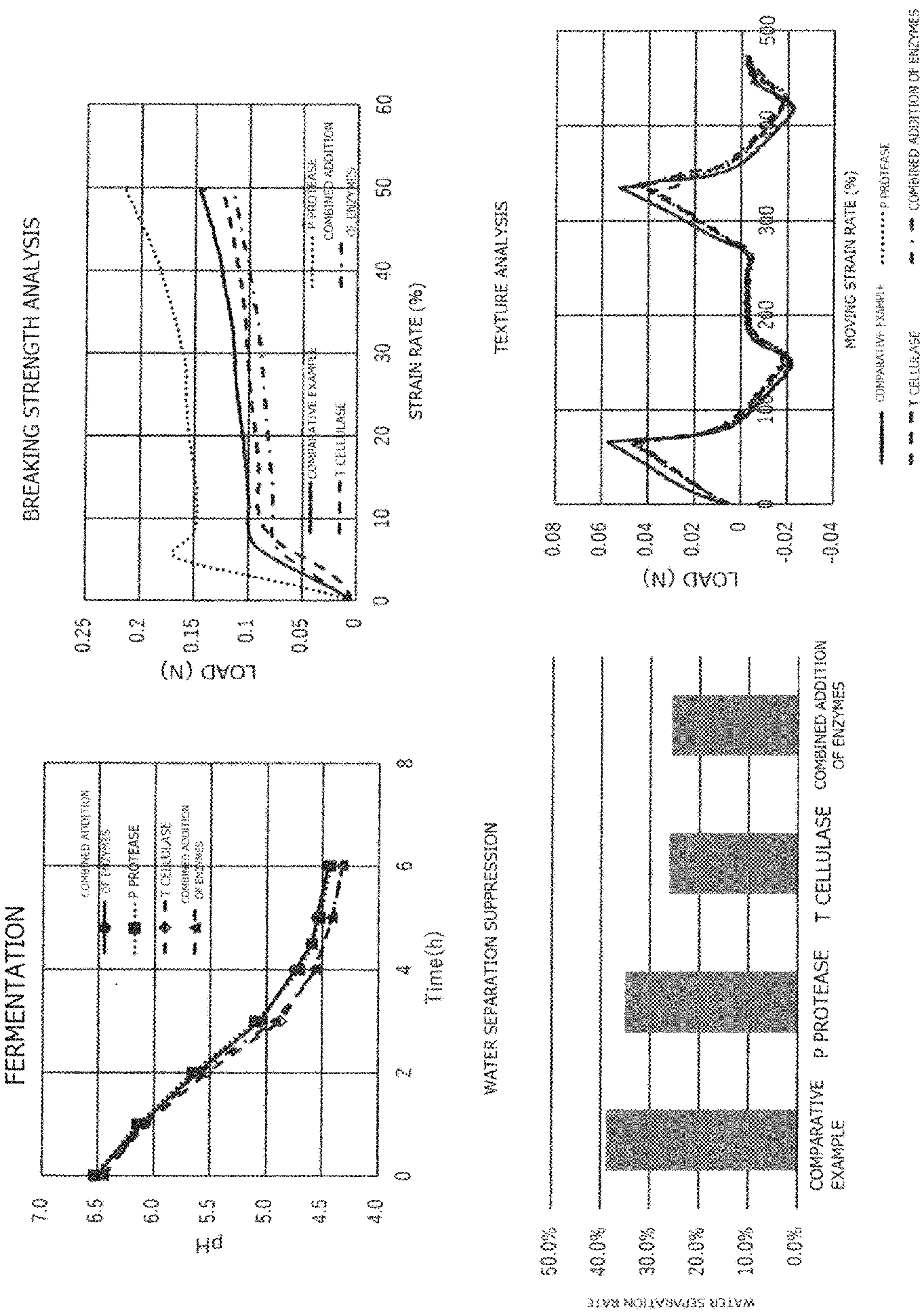
FIG. 17 shows the evaluation results of the fermentation progress (upper left), breaking strength analysis (upper right), water separation suppression (lower left), and texture analysis (lower right) of the almond milk fermented products of Production Example 21 and Comparative Example 15.

The results of Production Example 21 and Comparative Example 15 are shown in FIG. 17.

As shown in FIG. 17, the addition of P protease increased the gel strength of the almond milk fermented product. The results are different from those in FIG. 16. The reason is unknown, but it is assumed that the reactivity of the enzyme to the substrate in the almond milk changed due to differences in the components in the almond milk (difference in the initial pH with and without lipid and the pH adjuster (added in Production Examples 19 and 20, but not in Production Example 21)).

The addition of T cellulase decreased the gel strength and water separation suppression effect of the almond milk fermented product.

The sensory evaluation of the almond milk fermented products of Production Examples 19 to 21 was as follows. All the contents are common to the enzyme-added groups. No bitterness was caused in any of the almond milk fermented products.

The lumps tend to be slightly smaller in the enzyme-added groups.

Perhaps because the lumps were smaller, they fell more smoothly when dropped from the spoon.

Adding the enzymes increased sourness. T cellulase seemed to increase the richness and gave the impression of profound flavor.

Production of Oat Milk Fermented Product

Production Example 22

Commercially available oat milk (trade name: Alpro "Oat Milk", manufactured by Danone Japan Co., Ltd., base: oats, protein content: 0.3% by mass (w/v)) was placed in a sterilized glass container, and a lactic acid bacteria starter YF-L812, *bifidobacterium* BB12, and P protease and/or T cellulase were added simultaneously. When oat milk was used as the standard, the concentrations of the starter, BB12, P protease, and T cellulase added were 0.1 mg/g, 0.05 mg/g, 1.0 (PU/g), and 3.4 (PU/g), respectively (all at final concentration). In the system with P protease and T cellulase, P protease was added at 1.0 (PU/g) and T cellulase at 3.4 (PU/g) (both at final concentration). The oat milk with the starter, BB12, and P protease was stirred in a thermostatic water bath at 43° C. for 10 to 15 minutes. It was then dispensed into glass containers (manufactured by Toyo Glass Co., Ltd., 90 mL capacity) and fermented at 43° C. for 6 hours. The fermented preparation was refrigerated (from 4 to 5° C.) for one day or more to obtain an oat milk fermented product of Production Example 22.

No separate enzyme inactivation step was performed in the above production method.

Comparative Example 16

An oat milk fermented product of Comparative Example 16 was obtained in the same manner as in Production Example 22 except that P protease, T cellulase, P protease and T cellulase were not added.

Evaluation

Figure 18:
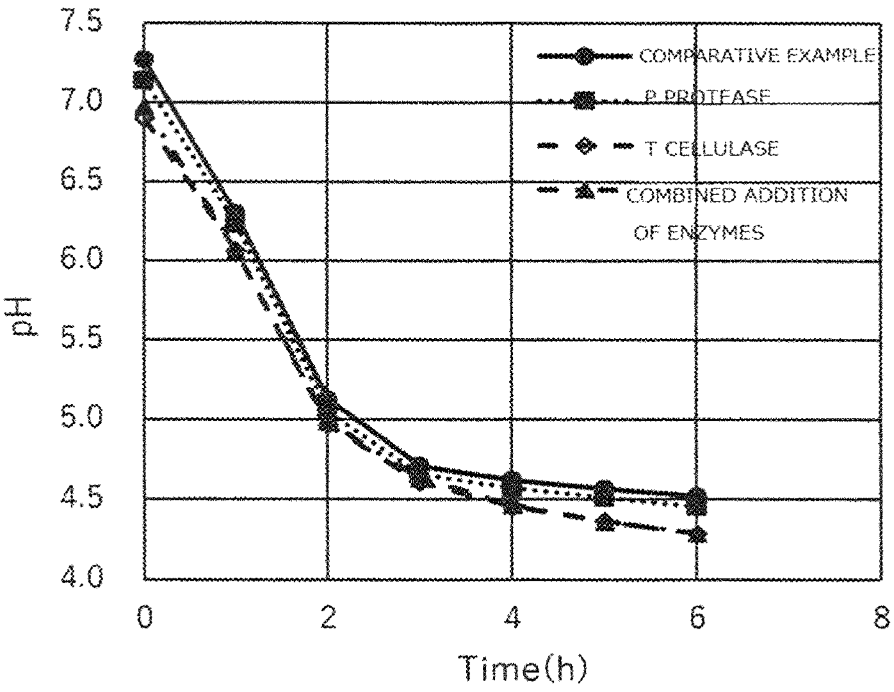
FIG. 18 shows the fermentation progress of the oat milk fermented products of Production Example 22 and Comparative Example 16.

FIG. 18 shows the fermentation progress of the oat milk fermented products of Production Example 22 and Comparative Example 16.

P protease was found to slightly accelerate fermentation, and the addition of T cellulase was found to accelerate fermentation.

No gel was formed in either of the oat milk fermented products.

The addition of the enzyme changed the type of sourness and enhanced astringency. No bitterness was observed in any of the oat milk fermented products. It was suggested that the enzymes could be used according to purposes.

Production of Macadamia Nut Milk Fermented Product

Production Example 23

Commercially available macadamia nut milk (product name: Macadamia Milk, manufactured by Kikkoman Corporation, base: macadamia nut paste, protein contend: 0.3% by mass (w/v)) was placed in a sterilized glass container, and the lactic acid bacteria starter YF-L812, *bifidobacterium* BB12, and P protease and/or T cellulase were added simultaneously. When macadamia nut milk was used as the standard, the concentrations of the starter, BB12, P protease, and T cellulase added were 0.1 mg/g, 0.05 mg/g, 1.0 (PU/g), and 3.4 (PU/g), respectively (all at final concentration). In the system with P protease and T cellulase, P protease was added at 1.0 (PU/g) and T cellulase at 3.4 (PU/g) (both at final concentration). The macadamia nut milk with the starter, BB12, and P protease was stirred in a thermostatic water bath at 43° C. for 10 to 15 minutes. It was then dispensed into glass containers (manufactured by Toyo Glass Co., Ltd., 90 mL capacity) and fermented at 43° C. for 6 hours. The fermented preparation was refrigerated (from 4 to 5° C.) for one day or more to obtain a macadamia nut milk fermented product of Production Example 23.

No separate enzyme inactivation step was performed in the above production method.

Comparative Example 17

A macadamia nut milk fermented product of Comparative Example 17 was obtained in the same manner as in Production Example 22, except that neither P protease, T cellulase, nor the combination of P protease and T cellulase was not added.

Evaluation

Figure 19:
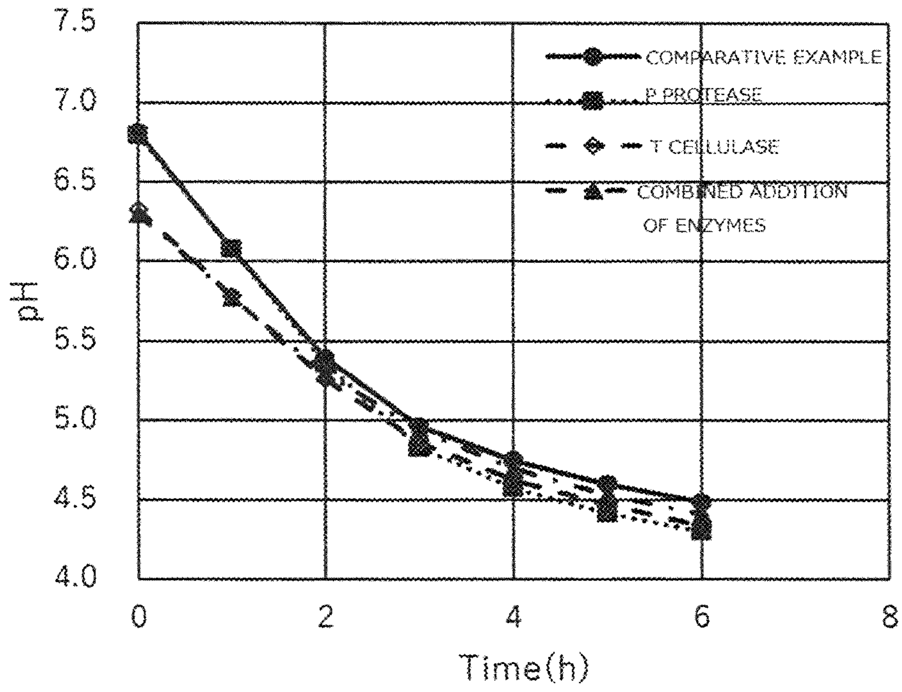
FIG. 19 shows the fermentation progress of the macadamia nut milk fermented products of Production Example 23 and Comparative Example 17.

FIG. 19 shows the fermentation progress of the macadamia nut milk fermented products of Production Example 23 and Comparative Example 17.

P protease was confirmed to accelerate the fermentation. The addition of T cellulase was found to slightly accelerate fermentation.

No gel was formed in any of the macadamia nut milk fermented products.

The addition of the enzyme changed the type of sourness and enhanced astringency. No bitterness was confirmed in any of the macadamia nut milk fermented products. It was suggested that the enzymes could be used according to purposes.

Production of Oat Milk Fermented Product

Production Example 24

In 86.3% by mass of water, 3% by mass of commercially available oat flour (product name: Oat Flour, ingredients (origin (100% oats/oats/corn oats (USA/Canada), protein content: 13.15%)) and 1.5% by mass of commercially available horse bean protein (product name: Fava Bean Protein, manufactured by Bio Actives Japan Corporation, protein content: 86.0% by mass) were dispersed to obtain a suspension. A mixture of 7% by mass of cane sugar, 2% by mass of tapioca starch, and 0.2% by mass of CMC was added to the above suspension and sterilized at 95° C. for 5 minutes to obtain oats milk.

*Bifidobacterium* BB 12 and P protease or T cellulase were simultaneously added to the oat milk. When oat milk was used as the standard, the concentrations of the starter, BB12, P protease, and T cellulase added were 0.1 mg/g, 0.05 mg/g, 1.0 (PU/g), and 3.4 (PU/g), respectively (all at final concentration). The oat milk with the starter, BB12, and P protease was stirred in a thermostatic water bath at 43° C. for 10 to 15 minutes. It was then dispensed into glass containers (manufactured by Toyo Glass Co., Ltd., 90 mL capacity) and fermented at 43° C. for 6 hours. The fermented preparation was refrigerated (from 4 to 5° C.) for one day or more to obtain an oat milk fermented product of Production Example 24.

No separate enzyme inactivation step was performed in the above production method.

Comparative Example 18

An oat milk fermented product of Comparative Example 18 was obtained in the same manner as in Production Example 24, except that P protease or T cellulase was not added.

Evaluation

Figure 20:
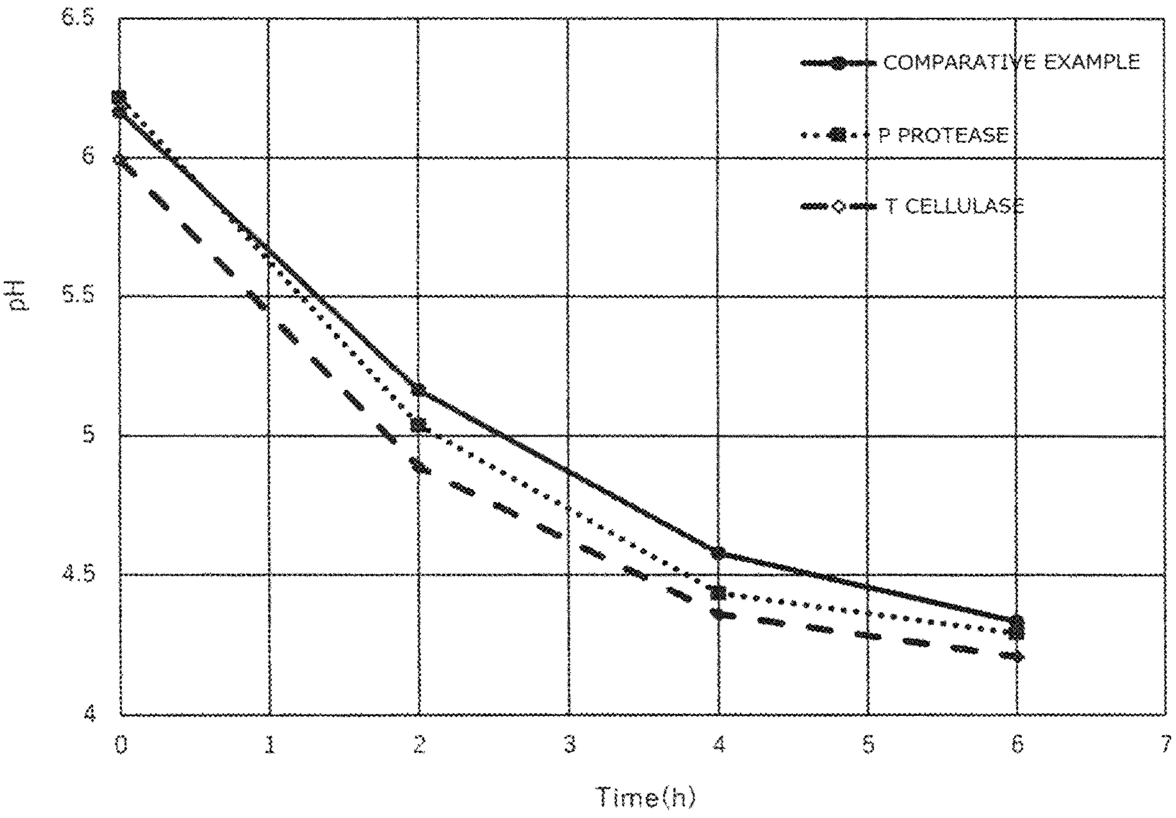
FIG. 20 shows the fermentation progress of the oat milk fermented products of Production Example 24 and Comparative Example 18.

FIG. 20 shows the fermentation progress of the oat milk fermented products of Production Example 24 and Comparative Example 18.

Fermentation acceleration effect was higher in the T cellulase- and P protease-added groups, in that order.

The number of lactic acid bacteria and bifidobacteria in the oat milk fermented product increased in the T cellulase- and P protease-added groups.

The comparative example and the oat milk fermented product with P protease formed a gel, albeit in a loose state. The oat milk fermented product with T cellulase was liquid and thickened, while the oat milk fermented product with P protease decreased adhesiveness.

The P protease-added group had stronger sourness than the comparative example, and dissolved more easily in the mouth than the comparative example. The T cellulase-added group resulted in a considerably stronger sourness than the comparative group. None of the oat milk fermented products caused bitterness.

The invention claimed is:

1. A method for producing a vegetable milk fermented product, the method comprising:

mixing vegetable milk and lactic acid bacteria to obtain a mixed liquid;

fermenting the mixed liquid; and adding a protease from *Paenibacillus* sp. to the vegetable milk or the mixed liquid, wherein the adding of the protease is performed before the fermenting of the mixed liquid is completed and at substantially the same time as the mixing of the vegetable milk and the lactic acid bacteria, wherein an enzyme inactivation process is not conducted at the end of the fermentation process, and wherein an amount of the protease added to the vegetable milk or the mixed liquid is from 0.01 to 20.0 PU/g based on the total mass of the vegetable milk.

2. The method according to claim 1, wherein the vegetable milk contains a protein in an amount of from 0.1% to 20% by mass.

3. The method according to claim 1, wherein the protease is added to the vegetable milk or the mixed liquid.

4. The method according to claim 1, wherein the protease is produced by a bacterium belonging to *Paenibacillus* sp., is stable at pH 5.5 to 9.0 with optimum pH of from 7.0 to 8.0, acts at 20 to 75° C. with optimum temperature of from 50 to 60° C., and has a molecular weight of from 32,000 to 34,000 Da as estimated by SDS polyacrylamide gel electrophoresis.

5. The method according to claim 1, wherein the vegetable milk comprises at least one selected from the group consisting of soy milk, almond milk, oat milk, and macadamia nut milk, or an extract or concentrate thereof.

6. A method for producing a vegetable milk fermented product, the method comprising:

mixing vegetable milk and lactic acid bacteria to obtain a mixed liquid;

fermenting the mixed liquid; and adding a protease from *Paenibacillus* sp. and a cellulase from *Trichoderma* sp. to the vegetable milk or the mixed liquid, wherein the adding of the protease and the cellulase is performed before the fermenting of the mixed liquid is completed and at substantially the same time as the mixing of the vegetable milk and the lactic acid bacteria, and wherein an enzyme inactivation process is not conducted at the end of the fermentation process, and wherein an amount of the protease added to the vegetable milk or the mixed liquid is from 0.01 to 20.0 PU/g based on the total mass of the vegetable milk.

7. The method according to claim 6, wherein an amount of the cellulase added to the vegetable milk or the mixed liquid is from 0.001 to 1 U/g in terms of FPase activity and from 0.0001 to 22 U/g in terms of CMCase activity based on the total mass of the vegetable milk.

* * * * *